Figure 1:
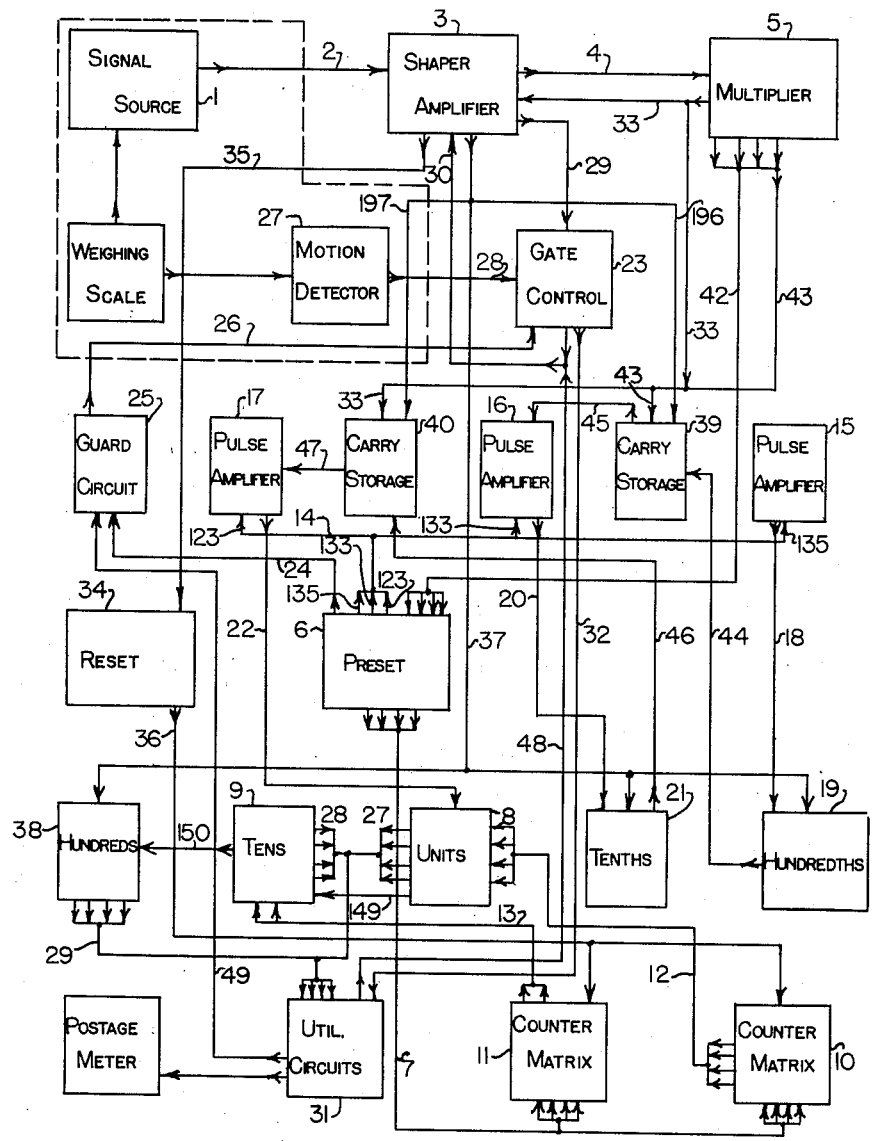

June 19, 1962

R. E. BELL ET AL 3,039,686

LOAD MEASURING APPARATUS

Filed May 8, 1957

13 Sheets-Sheet 1

INVENTOR.
ROBERT E. BELL
ROGER B. WILLIAMS JR.
BY

ATTORNEYS

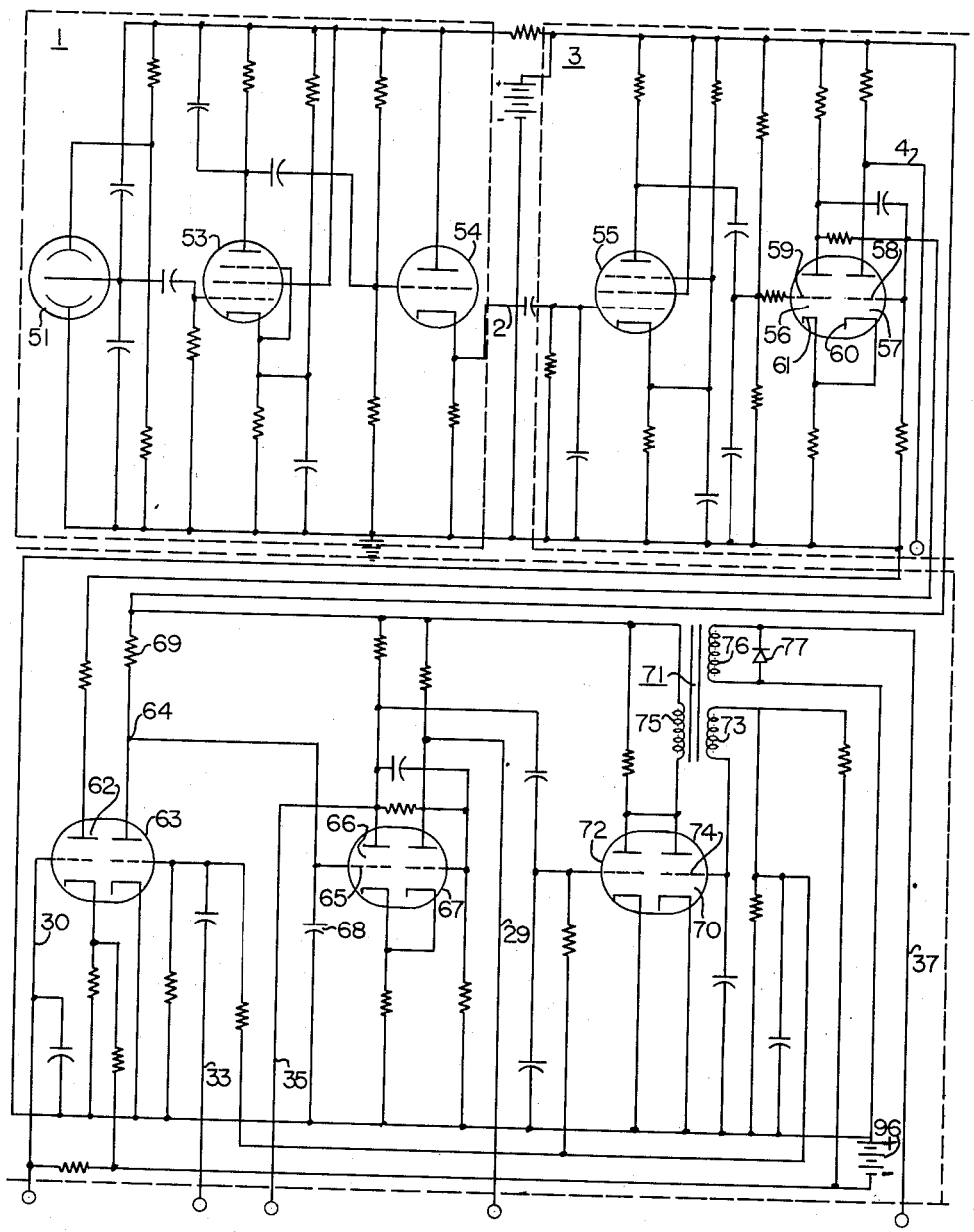
Fig. II

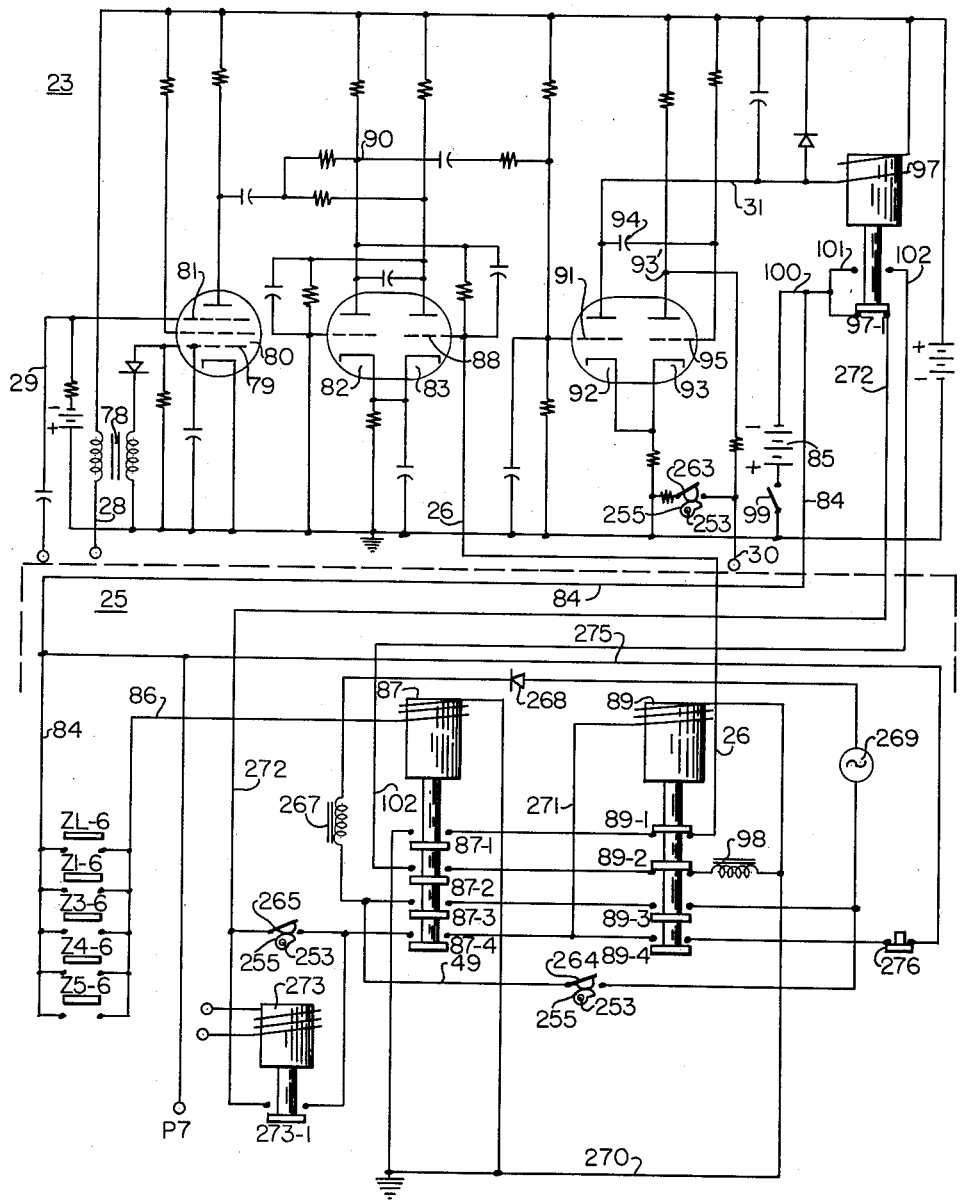
Fig. III

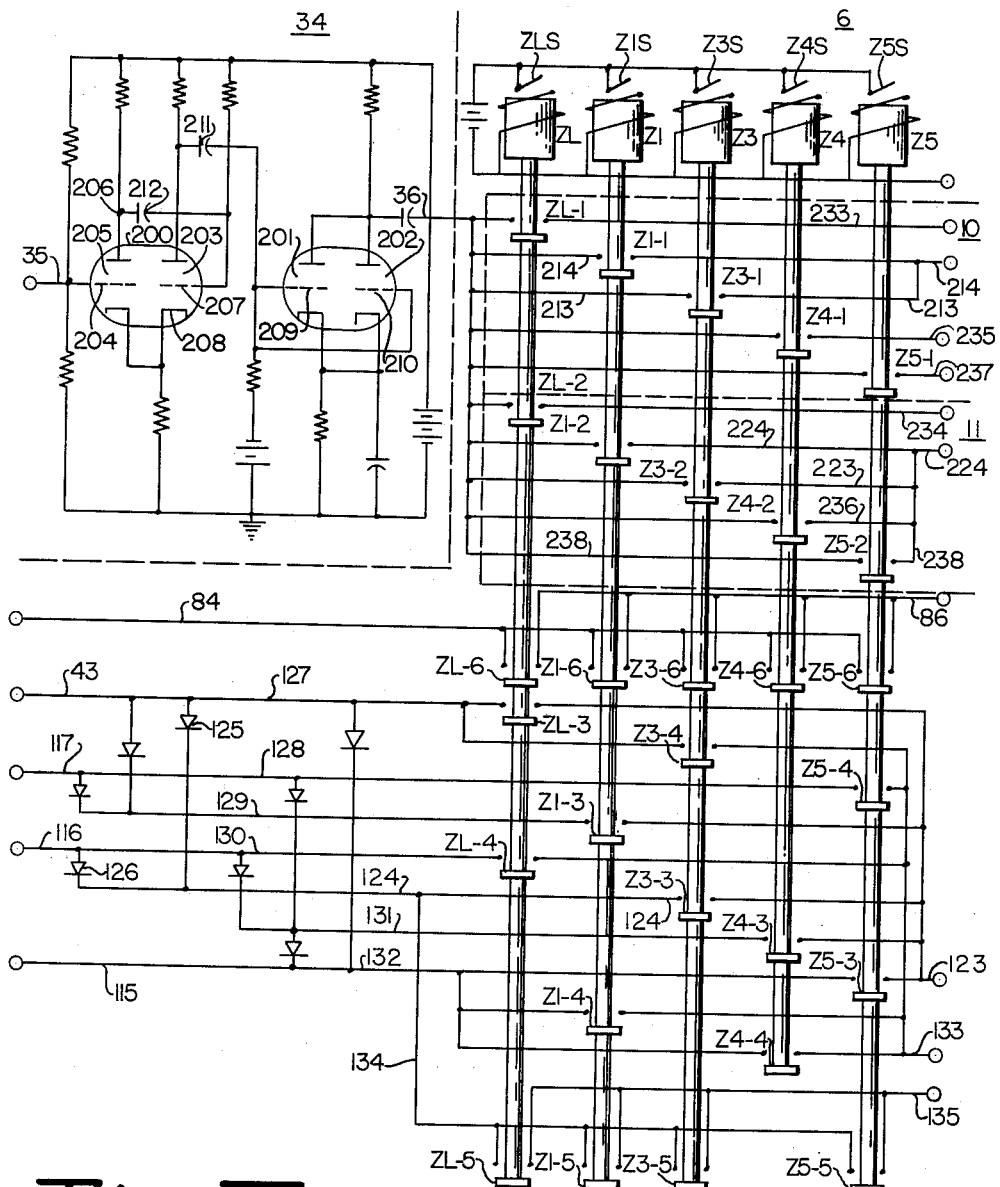
Fig. IV

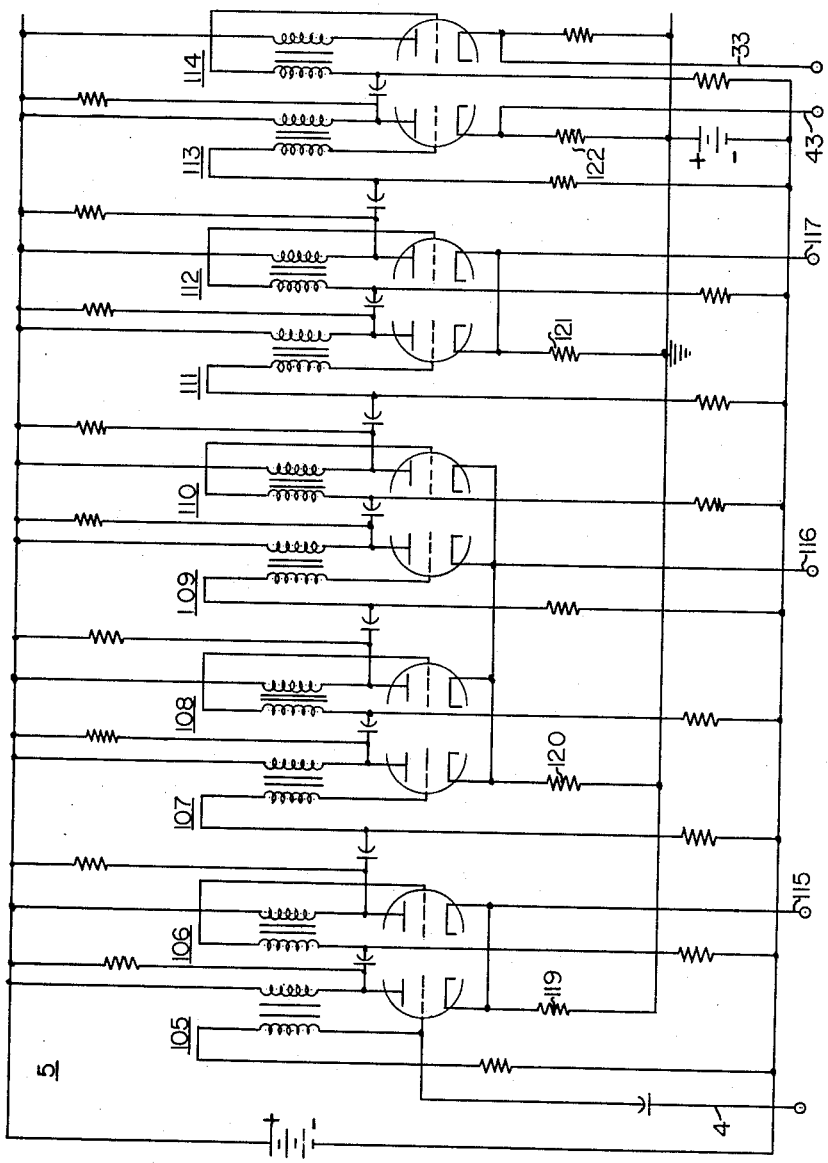

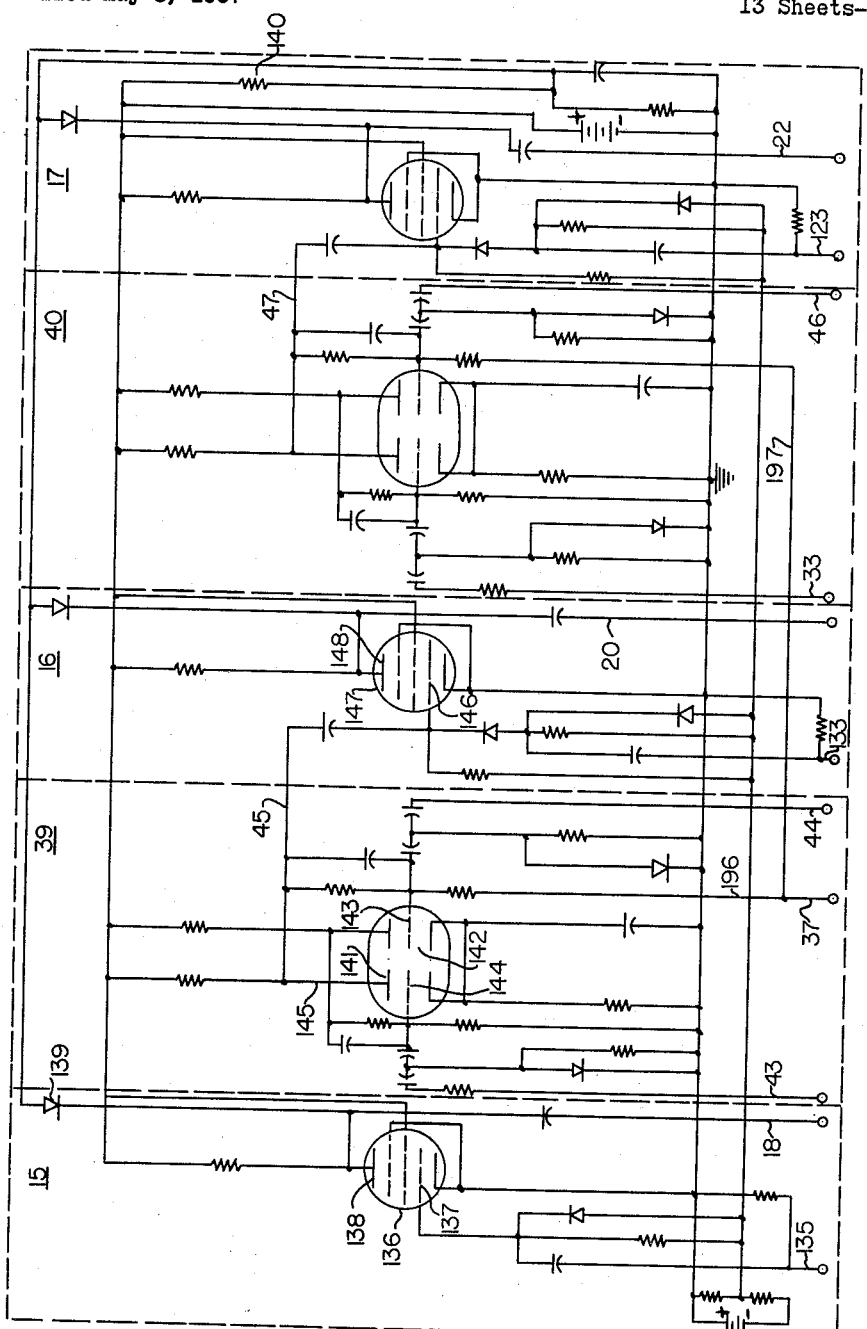

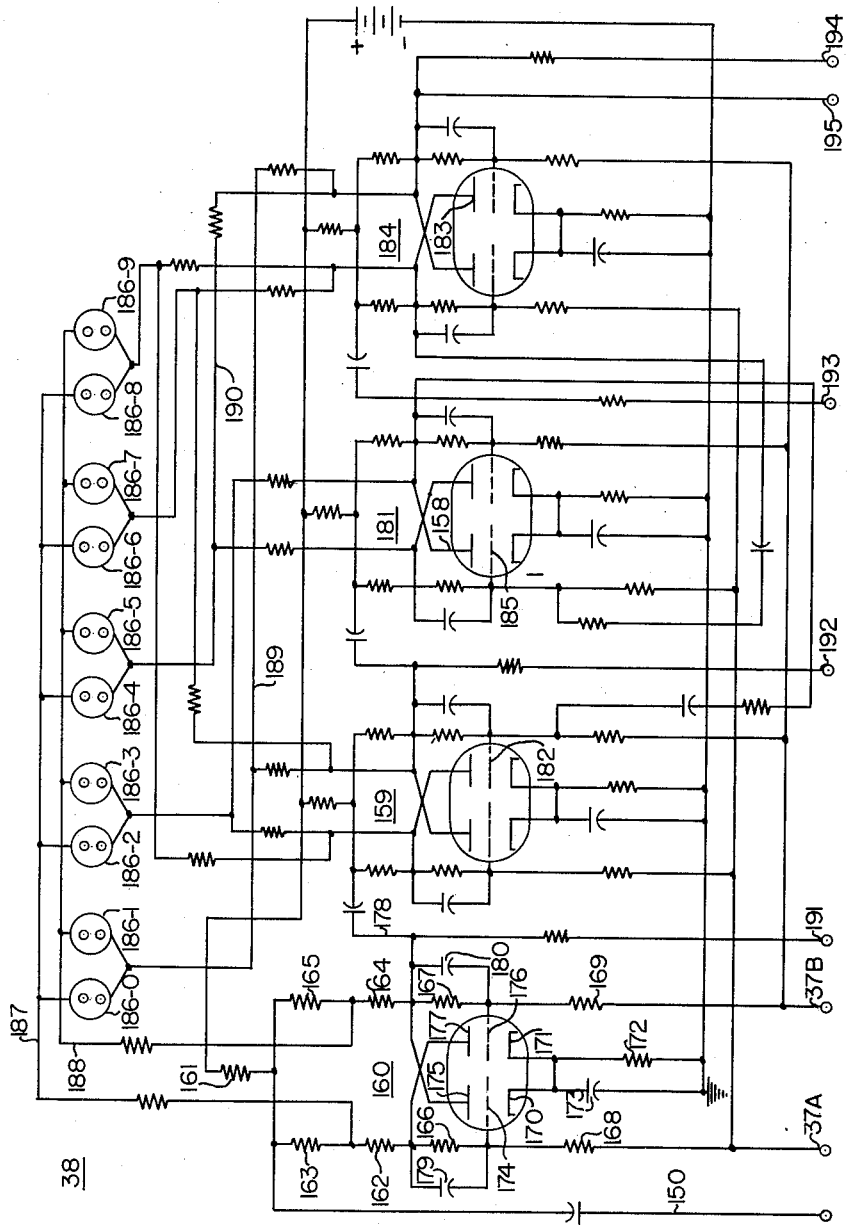

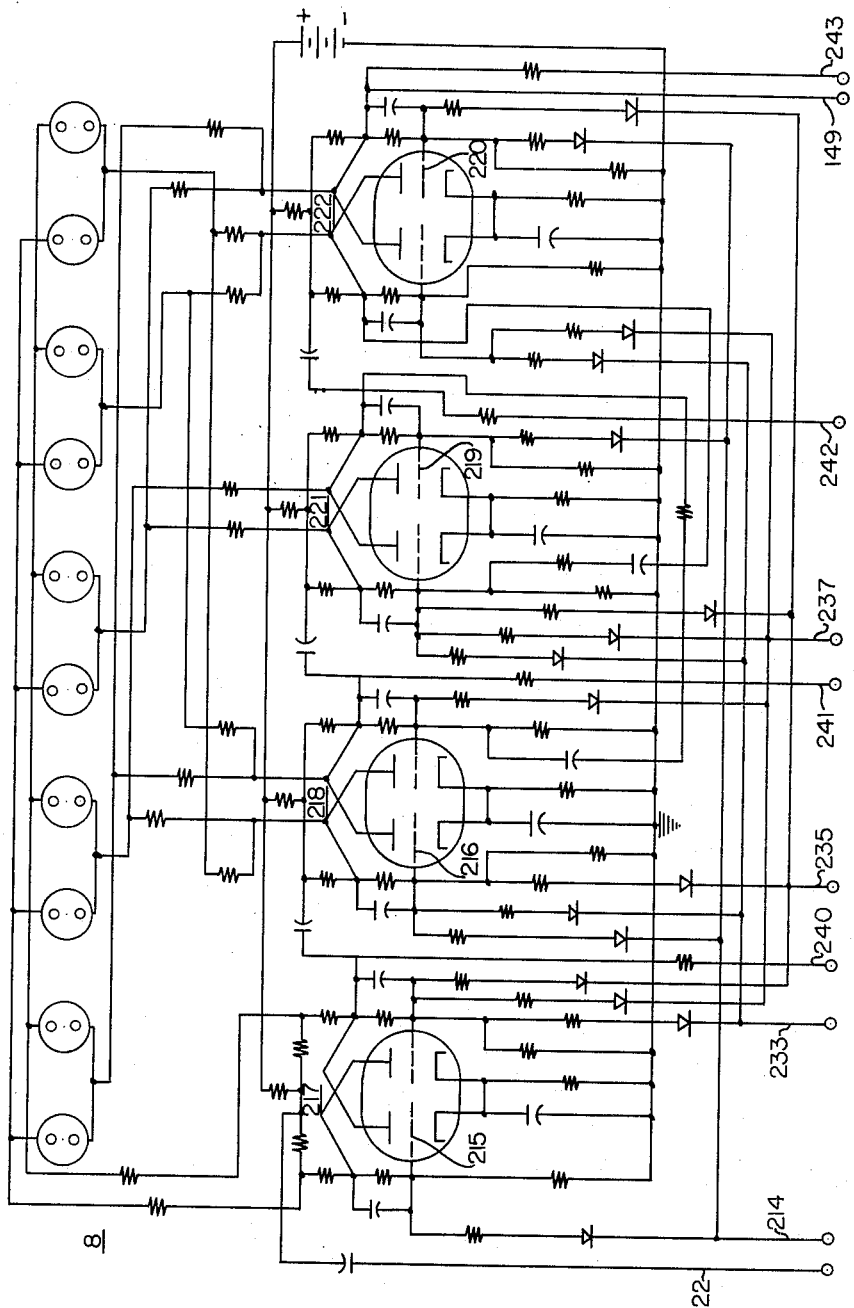

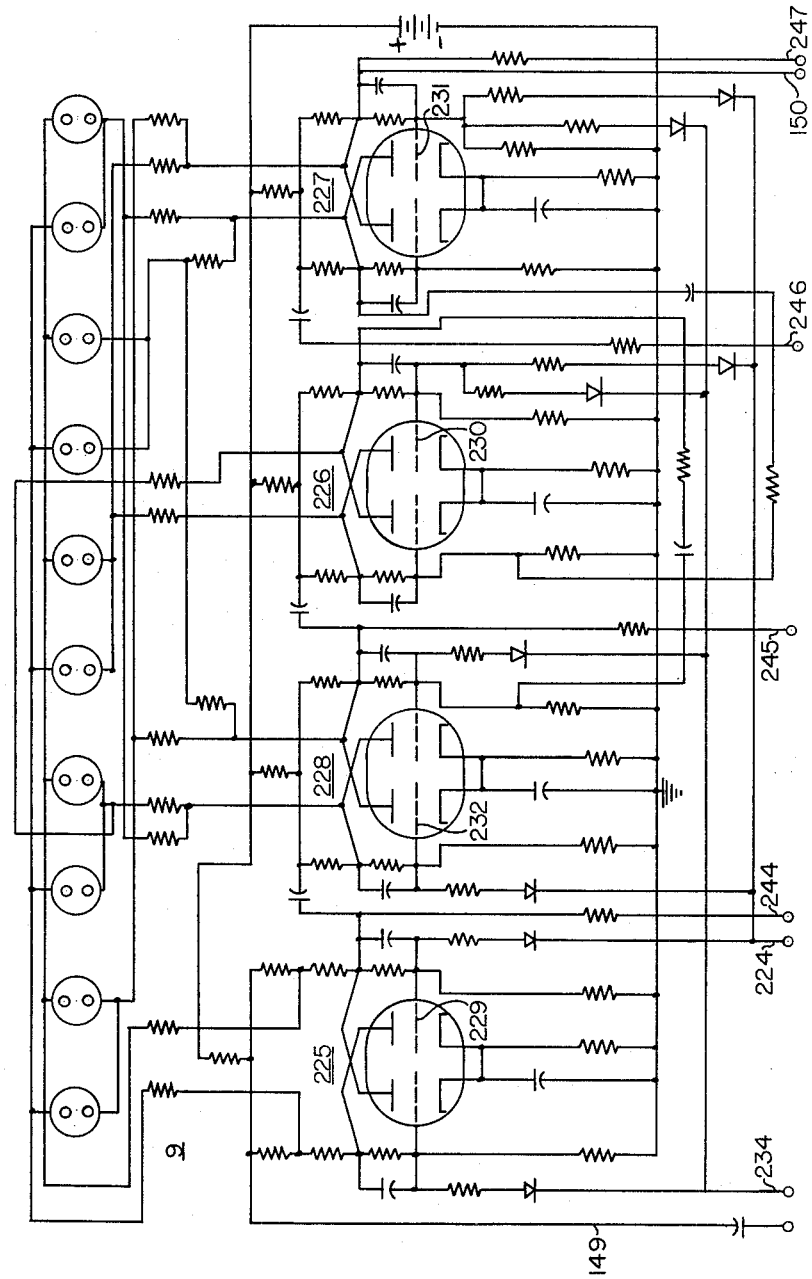
Fig. IX

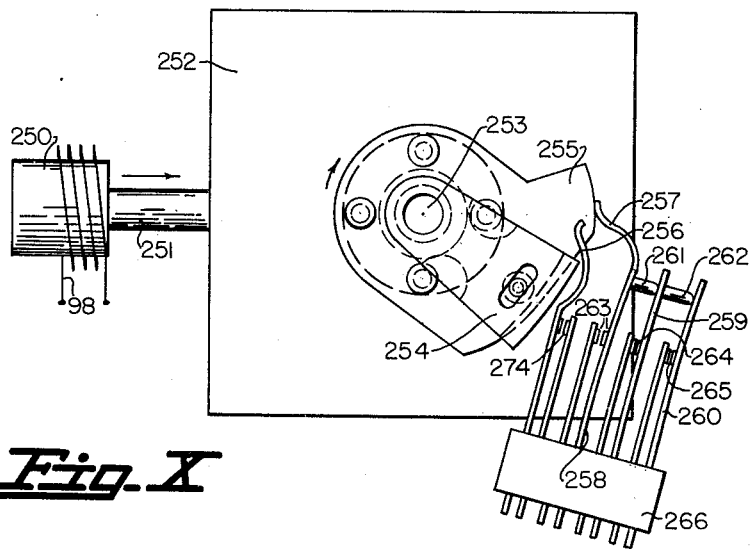
Fig. X
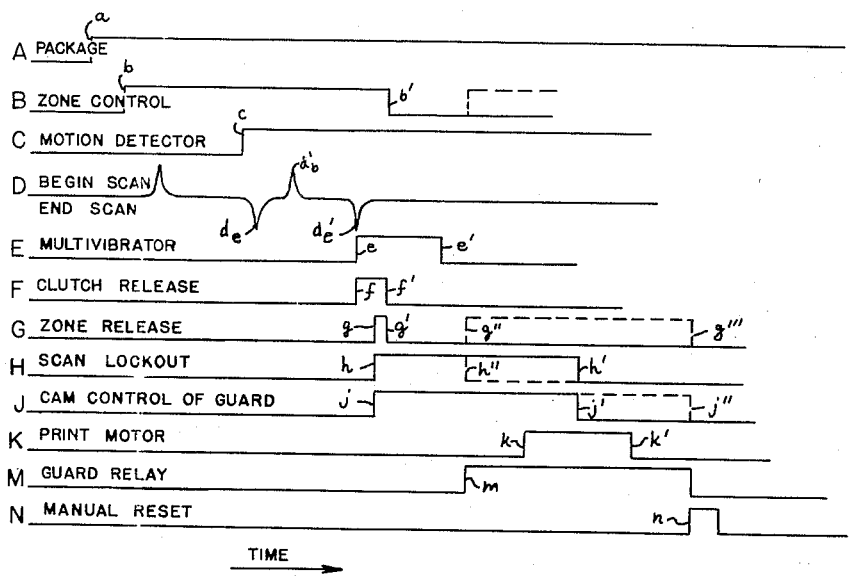
Fig. XI
INVENTOR.
ROBERT E. BELL
ROGER B. WILLIAMS JR.
BY
Marshall, Marshall Yeasting
ATTORNEYS June 19, 1962 R. E. BELL ET AL 3,039,686
LOAD MEASURING APPARATUS
Filed May 8, 1957 13 Sheets-Sheet 11
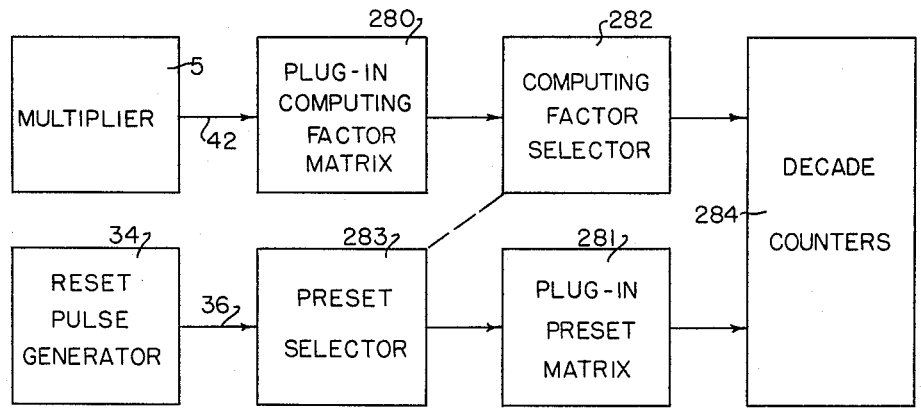
_Fig. XII_
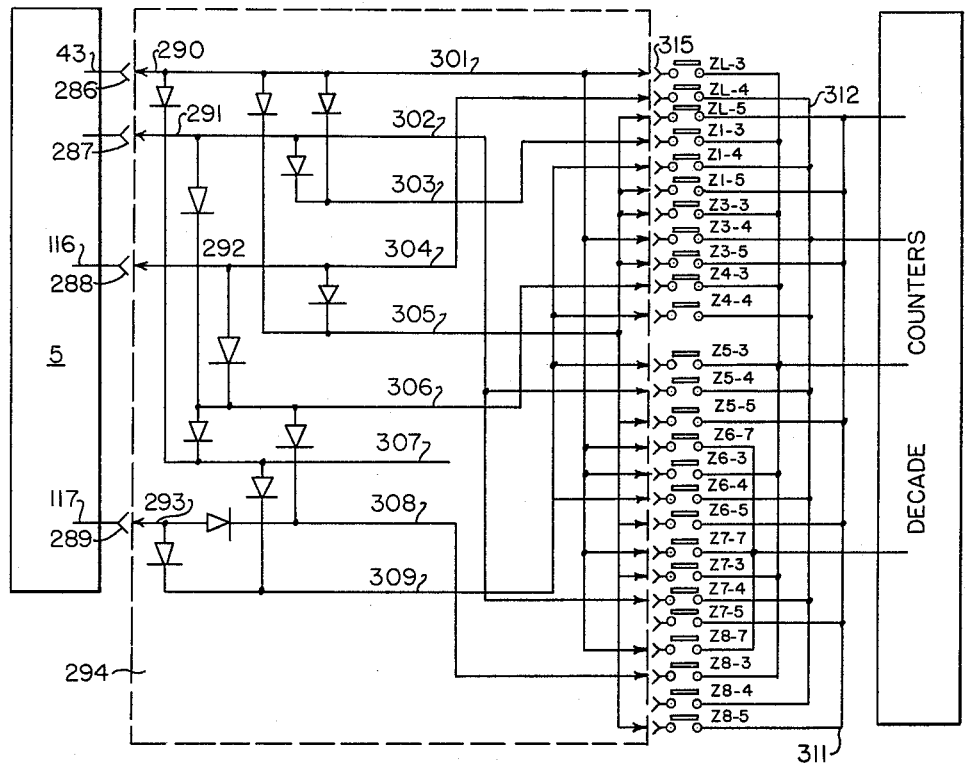
_Fig. XIII_
INVENTOR.
ROBERT E. BELL
ROGER B. WILLIAMS JR.
BY
Marshall, Marshall & Yeasting
ATTORNEYS

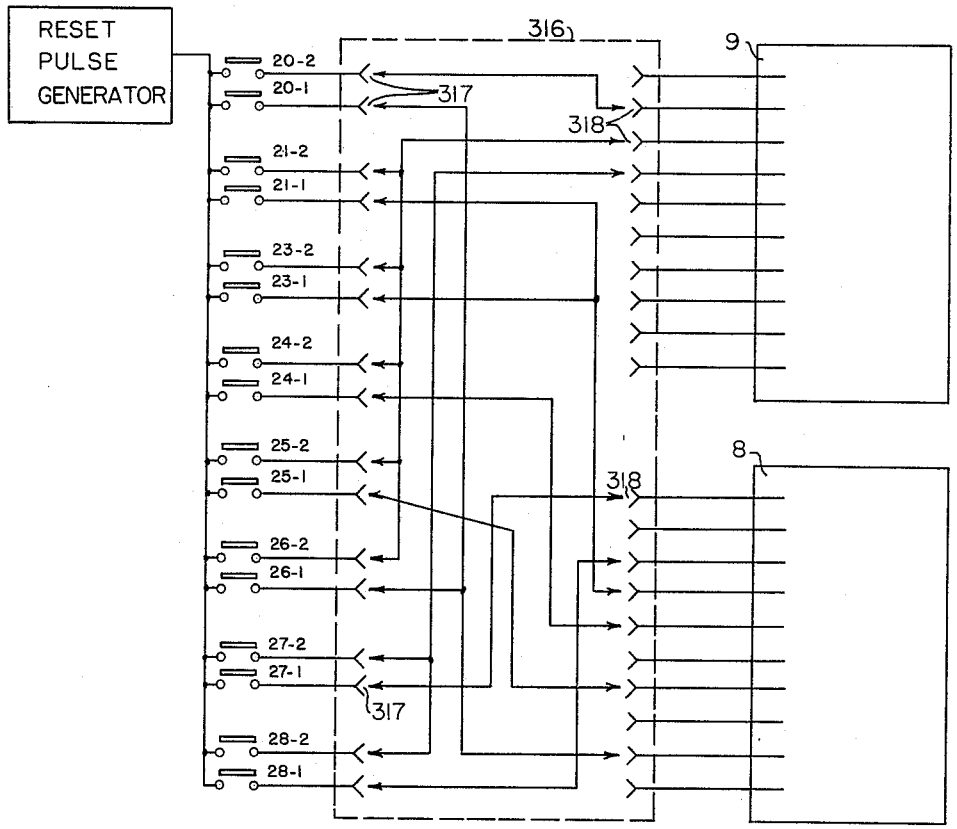
Fig. XIV
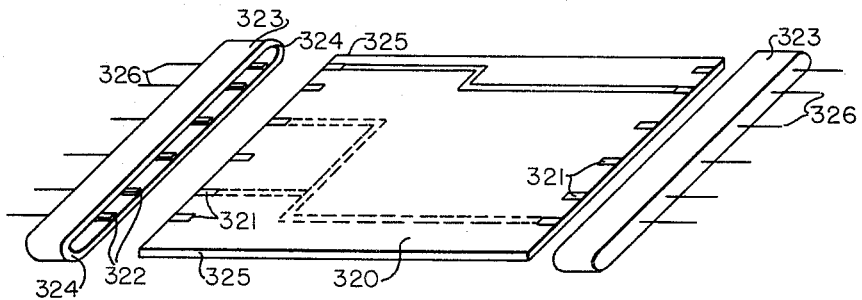
Fig. XV

June 19, 1962   R. E. BELL ET AL   3,039,686
LOAD MEASURING APPARATUS
Filed May 8, 1957   13 Sheets-Sheet 13
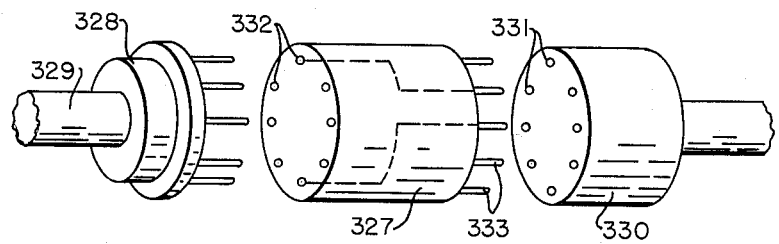
_Fig. XVI_
_Fig. XVII_
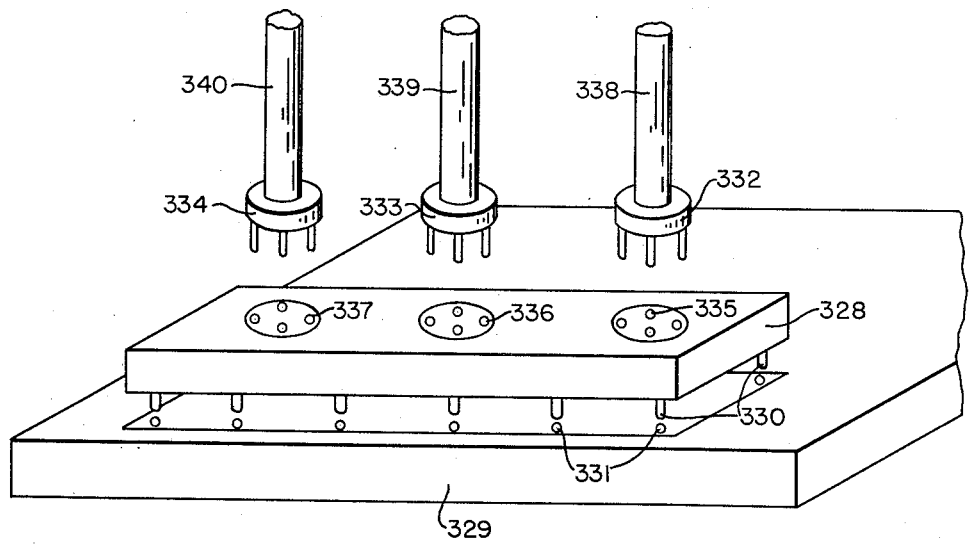
INVENTOR.
ROBERT E. BELL
ROGER B. WILLIAMS JR.
BY
Marshall, Marshall & Easting
ATTORNEYS

United States Patent Office 3,039,686
Patented June 19, 1962

3,039,686
LOAD MEASURING APPARATUS
Robert E. Bell and Roger B. Williams, Jr., Toledo, Ohio, assignors, by mesne assignments, to Toledo Scale Corporation, Toledo, Ohio, a corporation of Ohio
Filed May 8, 1957, Ser. No. 657,947
30 Claims. (Cl. 235—151)

This invention relates to computing devices and more particularly to computing devices integrated with condition responsive means such as weighing scales and with utilization means such as indicators, tabulation means, printing devices and the like wherein a computing factor is combined with the response from the condition responsive element to actuate a device providing a useful output.

One object of this invention is to improve computing weighing scales.

A second object is to avoid false computations in a computing device having input information fed from a condition responsive device.

A third object is to maintain computing devices relatively simple while increasing their flexibility.

A fourth object is to enable a computer to be set selectively to develop any of a plurality of constants such as minimum or initial output signals.

Another object is to insure that the combined signal source, computer and utilization means are all conditioned appropriately prior to the initiation of their operation.

A further object is to maintain positively a correlation between selected computation factors and selected constants set into a computer where both those factors and constants can be varied in a related manner by a single control.

Another object is to facilitate the establishment of a group of selectable constants and/or computing factors such that a limited group of values can be changed without requiring a major change in the computer. Advantageously, such changes are desirably effected as a relatively simple maintenance operation yet cannot be made either intentionally or inadvertently in normal operation of the system.

A still further object is to ascertain the postage charges for a parcel and produce a metered label in the amount of those charges accurately, rapidly and automatically.

In realizing the above objects a condition responsive device has been combined with computer and a utilization device. The computer has been arranged to respond to the signals from the condition responsive device only under certain conditions in order to avoid false or undesired operation and to generally sense the existence of those conditions automatically. Only a minimum of effort or thought on the part of operating personnel is required to operate the system by virtue of the simplified control means employed, yet incorrect operation is virtually impossible due to the inclusion of guard means. Further the system is arranged for rapid operation such that the actuation of the condition responsive element can be terminated prior to the completion of the system's functions, in particular prior to the operation of the utilization means.

A system for computing the postage rates for items to be sent by parcel post and for controlling a postage meter to cause it to print a label of the computed value will be described as an illustration of a specific embodiment of the invention. Such a system will include a weighing scale of convenient form such as a counter top type arranged to drive a signal translator feeding a computer. Controls for the computer enable computing factors and constants to be established therein so that they will be operated upon by appropriate input signals to generate an output. A decoder can couple this output to a utilization means or it can be fed directly to such means.

In the illustrative embodiment a translator of electrical signals having a form which is a function of the weight of the object applied to the weighing scale is employed to feed an electronic computer. In particular, the electrical signal is a series of pulses, the number of pulses corresponding to the weight of the object. The resulting pulses are fed to computer and control devices. In the computer, the pulses are multiplied by a chosen factor, the postal rate per pound in excess of the first pound for parcel post applications, and are accumulated with a correlated constant in electronic counters. Since the minimum charge for the first unit of weight is distinct from the multiplying factor, as is the rate for the first pound in parcel post computations, means are provided to insert that amount into the counters when it is indicated that the item being weighed has attained the minimum weight for the class of service provided. The multiplying factor and the minimum charge are fixed with respect to each other but may vary depending upon the nature of the item, e.g., the class of goods or in parcel post applications the destination of the parcel; accordingly, they can be set up in the computer simultaneously by operation of a single selector.

The computed value is stored in the counters until utilized through means of suitable coupling amplifiers to drive a group of electromechanical decoders which translate binary code to a decimal system which is represented by the position of certain members. These members, three in number in the example, establish the position of postage setting levers for cents, dimes and dollars in a commercial postage meter and then actuate the meter to print a metered label.

Both the multiplying factors and the initial state in the counters are established electrically thereby affording a high degree of flexibility to the computing system so that one or more of these values can be readily altered as where a postage rate is changed. Further, the electronic computation and electromechanical actuation of the postage meter are sufficiently rapid so that the entire automatic operation is accomplished in a small portion of the time required for the scale to accomplish the weighing. Therefore, the speed of the overall operation is essentially that of the weighing and the system saves much shipping personnel time.

The combination is also provided with means for detecting the instant the scale has reached equilibrium or has come sufficiently close to equilibrium to enable an accurate weight determination to be made therefrom. When this level of motion is reached, a signal, in practice the termination of pulses, is passed to a coincidence gate which also requires that the computer has been properly conditioned by operation of a postal zone selection to set up the multiplying factor and the initial counter values and that a complete readout cycle from the scale has been defined, the readout is repetitively operated, to initiate operation of the decoder and postal meter, and to bar further input signals to the multiplier and counter. This lockout prevents false operation of the combination resulting from either a premature readout, an inadvertent second zone selection, or spurious signals.

A feature of the invention resides in providing means in a computer for selectively inserting any of a plurality of fixed constants which are superimposed on the output.

Another feature involves controlling the introduction of constants simultaneously with the establishment of selected computing factors. This feature is of particular value where the constant and factor must be correlated.

A third feature comprises interlocking the factor selection and/or the constant selection with the operation of the combination to prevent faulty operation.

A fourth feature comprises interlocking computer input information, information source condition, and the initial conditioning of the computer with its release of computed values and the operation of utilization means coupled to its output.

Another feature resides in providing counters of a computer with a plurality of reset terminals whereby the application of a signal to one of said terminals resets the counter to a predetermined count.

An additional feature resides in the utilization of networks or matrices which can be inserted and removed from the computer structure to alter the values of particular constants and computing factors which are available for selection without requiring revision of the more complex circuits or the structure of the system.

The above and additional objects and features of this invention will be appreciated from the following detailed description when read with reference to the accompanying drawings wherein:

FIG. I is a block diagram illustrating functionally one cooperative assemblage embodying this invention;

FIG. II is a schematic circuit diagram of one form of readout device translating information from a condition responsive device to electrical signals characteristic of that condition and one form of circuit for utilizing such signals to control portions of the combination;

FIG. III is a schematic circuit diagram of further control means for the illustrative combination;

FIG. IV is a schematic diagram of one form of computation factor and constant selector according to this invention;

FIG. V is a pulse generator schematic typical of those applicable to the illustrated embodiment of the invention;

FIG. VI is a schematic of a means for applying the signals from the various orders of the multiplier to signal storage circuits and to combine those signals with carry signals from lower orders in the illustrative computer;

FIG. VII is a typical signal storage means or electronic counter schematic for the combination of FIG. I;

FIGS. VIII and IX are schematics of electronic counters for individual orders each arranged for insertion of a selected one of a plurality of counts, in accordance with one concept of this invention to establish desired initial count in those orders preparatory to the reception of multiplied pulses;

FIG. X is a portion of one form of utilization means which functions to establish desired operating sequences and to provide an interlock feature to guard against malfunctions in the system of this invention;

FIG. XI is a sequence diagram showing the relative instants of operation of certain elements of the invention;

FIG. XII is a block diagram of a portion of the circuit of FIG. I showing the relationship of replaceable networks or matrices for establishing the groups of computing factors and constants available for selection;

FIG. XIII is a plug-in circuit on a supporting structure having pressure type connectors, the circuit, which is illustrated schematically, establishing predetermined multiplying factors at predetermined terminals which are connected to certain input terminals of a selection circuit;

FIG. XIV is a schematic of an expanded matrix of the type shown in FIG. IV for establishing a group of preset values, or constants, which are available for selection and insertion in counters in a computing system of this invention, the matrix being formed on a support member for convenient removal and replacement; and FIGS. XV, XVI and XVII are perspectives of several illustrative forms of plug-in structures of FIGS. XII, XIII and XIV.

The exemplary system is arranged for simple and rapid operation which ordinarily requires only that the parcel to be mailed be placed upon a load receiver and the postal zone of its destination be signaled to the computer. When the movable system of weighing scale reaches a position or condition from which an accurate determination of weight can be had as determined by a sensing means such as a motion detector where static weighing is to be accomplished, the system will compute the postage and print a label if the load is within the limits of the system and the zone selection has been made. The completion of these functions is indicated by a zone set indicator which is actuated as the zone is selected and deactuated as the computation is effected. Upon deactivation of the indicator, the package can be removed from the scale even though the operation of the system is incomplete. At the end of the computing and utilization cycle the system is automatically cleared in preparation for the next cycle.

In order to guard against false operation as by a second zone selection operation in a single cycle, the zone selection is enabled but once and for but a limited interval. A second selection or continuation of the first selection beyond a given interval actuates a guard circuit which prevents the operation of the postage meter and disables the computer until it is manually reset, as by the operation of a reset control.

The several functions of the system are performed by subcombinations including a weighing scale which drives a pulse generator to generate repetitively trains of pulses, the number in each train corresponding to the weight of the parcel on the scale. These pulses are fed to a pulse shaper and amplifier which includes means to sense the first pulse of each train and the end of the train. This shaper-amplifier also feeds a pulse generator or multiplier which produces ten pulses for each pulse it is fed.

An end-of-scan pulse from the shaper-amplifier is sent to a control circuit which includes a pair of coincidence gates, the first requiring a signal from a motion detector signifying that the movable system of the scale has come to rest and a signal indicating that a zone selection has been made. The second gate functions if the first has operated and the end-of-scan pulse is received to cock the control circuit. The next succeeding end-of-scan pulse fires the control circuit to energize the utilization means, an electromechanical decoder, which sets the postage meter at the computed value and then causes it to print a label of that value.

Between successive end-of-scan pulses, the computer has been fed one complete pulse train and has computed the appropriate postage therefrom. These functions have been performed by feeding the pulses from the shaper-amplifier to the multiplier. Nine pulses are available in a factor establishing matrix so that from zero to nine pulses for each pulse of the train can be supplied therefrom to counters corresponding to the order of each digit in a selected computation factor. Thus, the example includes factors having three decimal orders, hundredths, tenths and units feeding counters for corresponding orders. The trailing edge of the ninth pulse from the multiplier triggers a carry-storage stage between the hundredths and tenths counters if the accumulated pulses in the hundreths counter exceed nine while the trailing edge of the tenth pulse triggers a carry storage stage between the tenths and units counters when the accumulated count in the tenths counter exceeds nine. As the count builds up in the units counter to nine the next count recycles it to zero and transmits a count to the tens counter. The tens counter feeds the hundreds counter when it is fed its tenth pulse.

Since a minimum rate must be applied for the first eight ounces to a pound and the product of the multiplying factor and any fraction of a pound exceeding the first pound added thereto, both the minimum and the factor are established simultaneously. Zone selection means in the form of a manual control, a pushbutton, energizes a relay corresponding to the zone to establish the appropriate multiplying factor, and set the counters at the minimum for that zone in addition to conditioning the gate of the control circuit. Thus, if the minimum weight is applied, the decoder is actuated by the minimum rate plus the product of the multiplying factor and any excess weight.

If the weight fails to attain the minimum, however, the decoder does not function and no label is printed.

In the drawings, FIG. I shows a signal source 1 which is actuated by a weighing scale to provide a signal or readout which is of a form characteristic of a displacement in a movable system in the scale. One such scale and readout mechanism is shown in the application of Clarence E. Adler entitled "Indicator Scanning Device," Serial No. 553,437, now Patent No. 2,849,437, which was filed December 16, 1955 wherein the displacement due to an applied load unmasks a portion of a stationary, opaque chart bearing a series of translucent lines, the number of lines exposed being proportional to that load. An optical scanner scans the chart to project a burst of light on a photoelectric cell for each unmasked translucent line scanned. The pulse train resulting from the translation of displacement to light bursts and then electrical pulses is fed from an amplifier over line 2 to a shaper-amplifier 3 which functions to translate the pulses to a form more acceptable to the follownig sections of the system and, when properly conditioned, to pass those pulses over line 4 to a multiplier 5. The prerequisites to transmission of the pulses of the multiplier 5 include the setting of the postal zone of the package designation, the reduction of motion in the moving system of the scale to a level permitting accurate readout by the scanner, and the definition of the bounds of a complete scanner generated pulse train. These conditions are sensed in gate control 23.

Zone selection is accomplished in a preset section 6, conveniently by operation of a single normally open contact for a given postal zone which energizes a corresponding zone relay, to select a minimum postal rate for the first pound and feed that information over cable 7 to cents and dimes counters 8 and 9 through presetting matrixes 10 and 11 connected to the respective counters by cables 12 and 13. Preset 6 also sets up a multiplying factor for each pound or fraction thereof in excess of the first pound so that a number of pulses corresponding to that factor are transmitted over cable 14 to pulse amplifiers 15, 16, and 17 and from thence over lead 18 to counter 19, lead 20 to counter 21 and lead 22 to counter 8 respectively.

Operation of a zone selector is indicated to control circuit 23 by means of lead 24 to guard circuit 25 and thence lead 26. Reduction of motion in the scale is sensed by motion detector 27 and fed to control circuit 23 over lead 28. Scan definition is accomplished in shaper 3 by means which signal the beginning and end of each pulse train resulting from a scan. End-of-scan signals are sent to the control 23 over lead 29. When motion has ceased, a zone has been selected, and two successive end-of-scan pulses (having one complete scan pulse train between them) have conditioned the control 23, it cuts off the transmission of further pulses from the shaper 3 to the multiplier 5 by application of a signal over lead 30 and initiates operation of utilization circuits 31, postage meter controls in the present example, by transmission of a signal over lead 32.

Since the multiplier 5 functions whenever it receives a pulse, it is desirable to reset the counters to their initial value either at the beginning or end of each multiplication. The system generates two resetting signals for this purpose. These signals are generated at the beginning of each multiplication by the multiplier 5 and are fed back to the shaper 3 over lead 33 if the package is of at least the minimum weight, eight ounces for parcel post. One reset signal in the form of a begin-scan pulse is transmitted from shaper-amplifier 3 to reset chassis 34 over lead 35, and from thence to counter matrixes 10 and 11 over lead 36. The other reset pulse emanates from shaper 3 over lead 37 leading directly to the hundreds or dollars counter 38, tenths or mils counter 21, hundredths counter 19, and carry-storage stages 39 and 40. Thus, at the beginning of each scan all signals previously stored in the computer are reset to their minimum values.

Multiplier 5 generates a fixed number of pulses for each pulse transmitted to it from the shaper. Advantageously ten pulses can be generated, the first nine being fed into the preset by cable 42 where the multiplying factor mechanism passes the appropriate number of pulses to the pulse amplifiers 15, 16, and 17 over cable 14. The trailing edges of the ninth and tenth pulse from multiplier 5 are passed by leads 43 and 33 respectively to carry storage stages 39 and 40 respectively. Thus, upon reaching their capacity, nine counts, the lower order counters recycle in response to further pulses and in doing so condition the carry storage stage with which they are associated for operation by the carry pulse. Counter 19 fills upon receiving nine pulses so that the tenth pulse resets it to zero and trips carry storage stage 39 to its abnormal condition by means of a signal over lead 44. The trailing edge of the next ninth pulse from the multiplier returns stage 39 to its normal state transmitting an extra or carry pulse on lead 45 to amplifier 16 and thence over lead 20 to the counter 21 of the next higher order. Similarly the trailing edge of the tenth pulse will return carry storage stage 40 from an abnormal condition created by a pulse on lead 46 to carry a pulse by way of lead 47 to amplifier 17, lead 22, and counter 8. This mode of carry storage prevents the coincidence of a carry pulse and a multiplier pulse in a counter. Carry storage is not necessary for counters 9 and 38 inasmuch as pulses are not fed from the multiplier, but rather, are derived from but one source, the next preceding counter stage, so that there is no possibility that pulses might arrive simultaneously from different sources.

When the computation for a scan is completed, the utilization circuits 31 are actuated by the second end-of-scan pulse which is effective on control 23. In addition to setting the postage meter these circuits also assume the lockout control of the shaper 3 initiated by control 23 by imposing a signal on lead 48 and lead 30 to prevent the transmission of additional pulse trains to the multiplier. Near the end of the utilization cycle, after the postage meter has been set, a signal is transmitted on lead 49 from circuits 31 to guard circuit 25 to reset the guard circuit and permit a new zone selection at the initiation of the next weighing, computing and postage metering cycle.

Turning now to the details of the exemplary embodiment to which this invention has been applied, it is to be appreciated that detailed disclosures of various portions of the overall combination are presented in copending applications. Scale structures embodying suitable translators for electrical readout of the load magnitude are shown in the aforementioned Clarence E. Adler application Serial No. 553,457, now Patent No. 2,893,126, filed December 16, 1955, entitled "Indicator Scanning Device" and Robert E. Bell and Roger B. Williams, Jr. application Serial No. 592,932, filed June 21, 1956 entitled "Industrial Computing Scale." The Bell and Williams application Serial No. 592,932 also shows the general configuration of the computer elements including shaper 3, multiplier or pulse generator 5, a means of setting multiplying factors corresponding in some respects to preset 6, pulse amplifiers 15, 16, and 17 carry storage stages 39 and 40, counters 19, 21, 8, 9, and 38 and a somewhat similar control 23 and reset means 34 all combined with a scale. A motion detector 27 for a scale and its cooperation with a control 23 and portions of a shaper 3 is shown in Robert E. Bell and Roger B. Williams, Jr. application Serial No. 657,826, entitled "Condition Responsive Device" filed herewith. The solenoid actuated selector mechanism of the utilization circuits 31 for controlling the postage meter is disclosed in the application entitled "Decoder," Serial No. 657,817, filed herewith for Clarence E. Adler.

In view of these supplementing disclosures which are incorporated herein by reference, these elements of the combination will be set forth but briefly with the objective of disclosing only so much of the detail as is essential to an understanding of their cooperative relationship with the inventive features.

In the case of a computing scale for parcel post packages the minimum weight to be detected is eight ounces since packages weighing less must be mailed under a different postal class. Parcel post postage is determined by the pound or any fraction of a pound, thus, a package weighing three pounds one ounce requires the postage for four pounds. Further, the postal rates for the illustrative application, limited to zone 5, are three digit factors in cents, tenths of a cent and hundredths of a cent, and the postal laws require that the next cent be charged for any fraction of a cent exceeding the even cent of the computed postage. Accordingly, the combination described below will include features which are particularly applicable to the determination of postage, it is to be understood, however, that many of the features embraced herein have more universal application. In particular, the presetting of a counter at one of a plurality of values which might be either positive or negative, either alone or simultaneously with the selection of a multiplying factor, has application in computing scales in which unit weights are to be automatically added or an automatic tare deduction is desired.

The invention is illustrated with a scale which can be of the spring type wherein weight of the package is converted into a vertical displacement of a shutter. The shutter moves past a 30 line chart, for a scale having a capacity of thirty pounds. The chart which is opaque with transparent lines is fixed with respect to the base of the scale. The lines are accurately positioned so that the first line is exposed when eight ounces are applied to the scale, and another line is exposed when the load exceeds one pound. Additional lines are exposed for each additional pound.

A scanner can be employed to read the number of lines exposed by a load. The scanner can consist of a projection lamp mounted on an arm which moves in an arc behind the chart, and a projection lens and mirror system which are mounted in front of the chart on an arm that moves with the lamp in such a manner that the lines of the chart are projected on a suitable electro-optical translater. Each line is projected in succession as a burst of light as the projection system scans the chart. Advantageously, the scanning system allows an interval between each scan so that the counts of successive scans can be distinguished.

FIG. II shows the details of a suitable signal source 1 as represented in FIG. I for translating bursts of light to electrical pulses. Such a source comprises a photoelectric cell 51 coupled to a scanner preamplifier consisting of a pentode amplifier including tube 53 which feeds the amplified signals to triode 54. The triode output is derived over lead 2 from a cathode follower whose function is to provide a low impedance source for the signal and thus reduce attenuation in the signal to the shaper 3 due to the capacitance in lead 2.

Pulses transmitted over line 2 to the shaper 3 are amplified by pentode 55 and fed to a Schmitt trigger comprising triodes 56 and 57 and their related circuitry to generate an essentially square pulse of suitable amplitude and duration for utilization by the multiplier 5. When the trigger is properly preconditioned, these pulses are fed to the multiplier as shown in FIG. I over lead 4 connected to the anode of triode 57.

The Schmitt trigger functions as a gate controlled by virtue of the bias on the grid of the noramally nonconducting stage 57. When the grid 58 of triode 57 is biased to cut off, scanner pulses are prevented from reaching the multiplier. In the quiescent state, the potential on grid 58 of triode 57 is sufficiently lower than that on the grid 59 of triode 56 so that triode 57 is cut off and triode 56 is conducting at full current. The application of a negative pulse from pentode 55 due to a burst of light on photocell 51 reduces the potential of grid 59 thereby reducing the plate current in triode 56. This reduces the potential of cathode 60 in triode 57 and increases the potential of its grid 58 thereby snapping the triode 57 to full conduction. Cathode 61 of triode 56 is hereby raised in potential to completely cutoff plate current in triode 56. This toggle action in the trigger is prevented under certain conditions by triode 62 which is used as a D.C. amplifier responsive to signals from the control chassis in a maner to be discussed below.

Signals are transmitted to the multiplier 5, shown in detail in FIG. V, from the Schmitt trigger over lead 4 to excite a series of ten puses for each input pulse. The trailing edge of the next to the last and the last pulse of the generated train are fed back to the shaper 3 over leads 43 and 33 respectively so that any stored carry signal is fed to the next order counter. The tenth pulse is also fed over lead 33 to an isolation amplifier including triode 63. The repeated application of this puse during a scan defines the scan. This positive going pulse on lead 33 is inverted in phase at point 64, is integrated, and is impressed on the grid 65 of the normally conducting stage, triode 66, of a Schmitt trigger including triode 66 and triode 67. The time constant of the integrating network, capacitor 68 and resistor 69, is long enough to maintain a bias on grid 65 sufficient to cut if off for the duration of the scan.

The first pulse through the isolation amplifier 63 causes the trigger to change to its abnormal state, triode 66 is cut off while conduction is initiated in triode 67. This condition is maintained until ten milliseconds after the last pulse of the scan signal occurs. This trigger defines the beginning and end of the scan signal and by virtue of its mode of actuation from the last stage of the multiplier it offers a positive indication that the multiplier is operative.

The beginning of a scan is marked by the positive going signal at the plate of triode 66, the normally conducting stage of the trigger, when it is cut off by the first pulse from the multiplier. This begin-scan signal is fed to the reset circuit 34 as shown in FIG. IV over lead 35 to generate a reset signal for counters 8 and 9. A second reset signal is generated in a blocking oscillator including triode 70 and transformer 71. The blocking oscillator is a low impedance source of a pulse of a positive polarity and sufficient duration to reset the carry storage stages 39 and 40, and the counters 38, 21 and 19. The positive going signal resulting from the cut off of triode 66 increases the plate current in triode 72 of a pulse amplifier which is plate coupled to the blocking oscillator. This current increase is reflected in the secondary winding 73 of transformer 71 as an increase in the potential of grid 74 of triode 70. In turn, this increased grid potential further increases the current through the primary 75 inducing the secondary 73 to impose a greater potential on grid 74. As the tube saturates no further increase is transmitted to the secondary and the oscillator returns to its quiescent state.

A useful output is derived from the blocking oscillator at lead 37 by means of a second secondary winding 76 on transformer 71. A diode 77 across winding 76 clips the negative overshoot as the oscillator returns to its quiescent state.

An end-of-scan signal is derived from Schmitt trigger, triodes 66 and 67, over lead 29 leading to gate control 23 of FIG. III as a result of the positive going signal taken from the plate of the abnormally conducting triode 67 as it returns to its normal nonconducting state shortly after the termination of the last pulse from the scanning operation. This signal is used in the control 23 in conjunction with others to provide coincidence gating of the signals controlling the utilization circuits and the transmission of signals to the multiplier 5 by the Schmitt trigger including triodes 56 and 57 of shaper 3.

As disclosed in detail in the above noted Bell and Williams, Jr. application for "Condition Responsive Device," Serial No. 657,826, premature response by the utilization circuits while the movable system of the scale is in motion is prevented by a motion detector. One suitable form of detector placing no restraining forces on the movable system translates motion into bursts of light. A translucent chart is supported from the movable system of the scale so that it extends into a projecting system which advantageously projects a visual indication of the load on the scale. The projecting system can comprise a projection lamp and a condensing lens on the back side of the movable chart, and, on the front side, a projection lens, a display surface for the projected image and a photocell positioned to receive a portion of that image. The photoelectric cell is irradiated with light bursts by a portion of the projected image which is not intended for display. This image can be formed by opaque lines generally normal to the displacement direction and located on the chart next to those opaque indicia intended for visual readout. When the scale movable system moves, a series of light and dark lines move across the photocell, causing it to generate pulses which are amplified by a motion detector preamplifier (not shown) and transmitted to a control circuit 23 over lead 28. Absence of these pulses conditions a gate in the control circuit 23 to pass signal pulses.

The control circuit is shown in FIG. III. Pulses on lead 28 are coupled by isolation transformer 78 to an integrating circuit which has a time constant of sufficient length to drive the control grid 79 of pentode 80 negative and maintain it at or below cut off between successive pulses of a series from the motion detector while it is moving to any appreciable extent. When these pulses cease, the grid potential rises enabling the tube to pass current when the suppressor grid 81 is driven sufficiently positive. An end-of-scan pulse from shaper 3 provides this trigger impulse over lead 29 as described above. The resulting negative going pulse from pentode gate 80 shifts the flip-flop including triodes 82 and 83, if it has been activated, from its normal condition with triode 82 cut off and triode 83 conducting to the abnormal condition with triode 82 conducting and triode 83 cut off. Activation of the flip-flop is accomplished by operating a zone selection switch ZLS, Z1S, Z3S, Z4S or Z5S, as shown in FIG. IV whereby the appropriate zone selection relay ZL, Z1, Z3, Z4 or Z5 is energized and a contact ZL–6, Z1–6, Z3–6, Z4–6 or Z5–6 associated therewith in the guard circuit 25 is closed to connect lead 84 from power source 85 to lead 86 to energize relay 87. Contact 87–1 is thereby closed to connect grid 88 of triode 83 to ground through normally closed contact 89–1 of relay 89 and lead 26. This places triode 83 in its normal, conductive state with leads 84 and 86 in combination functioning as lead 24 in the block diagram of FIG. I to couple the preset to the guard circuit.

The transfer of the flip-flop to its abnormal state when gate 80 is conducting depresses the potential of point 90 connected to the anode of triode 82 and the grid 88 of triode 83. The next succeeding end-of-scan pulse on lead 29 returns the flip-flop to its normal state thereby imposing a positive going signal at point 90. This signal is passed to grid 91 of triode 92. Triode 92 and triode 93 in combination with their related circuitry comprise a one shot multivibrator wherein the triode 93 is normally conducting and triode 92 is normally nonconducting. The positive signal at grid 91 shifts triode 92 to the conducting state and cuts off triode 93 by the negative going signal on capacitor 94 connected to grid 95. Capacitor 94 is of a magnitude such that it sustains a charge sufficient to hold triode 93 cut off for 150 milliseconds.

While triode 93 is cut off, the potential at point 93' is raised above its normal level, thereby overcoming the negative bias imposed by source 96 on the grid of triode 62 in the shaper 3 of FIG. II through the connection by lead 30 between that point and the grid. Triode 62 is placed in a conducting state to depress the potential of grid 58 in triode 57 to bar further scanner pulses from the multiplier. Thus, the gating action of the Schmitt trigger, triodes 56 and 57, in the shaper in passing or barring scan pulses to the multiplier 5 is controlled by the lockout action of the multivibrator in the control 23 and, in turn, by the motion in the scale, by the selection of a postal zone and by the transmission of a complete scane train. Plate current from triode 92 of FIG. IV also operates relay 97 to initiate the operation of the electromechanical decoder shown in the aforenoted C. E. Adler application as the signal to the multiplier is barred. Energization of this relay shifts contactor 97–1 upward to apply power from source 85 to a clutch release solenoid 98 in the utilization control provided guard relay 89 has not been operated. This solenoid is energized through a circuit including the normally closed, stand-by switch 99, leads 100 and 101, the relay contacts 97–1, lead 102, contact 87–2 of the zone selection relay 87, and normally closed contact 89–2 of guard relay 89. If an improper sequence of operations has occurred guard relay 89 is energized so that the operation of control relay 97 has no effect in energizing the clutch solenoid 98 and a false postage metering operation is avoided. The operation of the guard circuits energizing relay 89 will be discussed below.

The remainder of the system will best be understood from a consideration of a typical weighing operation. Assume a package with the limits of the postal laws for parcel post and within the scale capacity is placed in the scale, e.g. between eight ounces and 30 pounds, and a postage zone is selected which is that for the destination of the package, e.g. the third zone. The parcel post rates for the first five zones are:

| Zone | Minimum Postage First Pound | Each Additional Pound or Fraction |
| --- | --- | --- |
| Local | $0.18 | $0.0145 |
| 1st and 2nd | 0.23 | 0.0395 |
| 3rd | 0.23 | 0.0515 |
| 4th | 0.24 | 0.069 |
| 5th | 0.26 | 0.0925 |

During the excursion of the movable system in the scale pulses are transmitted from the motion detector 27 over lead 28 so that the control 23 prevents operation of the utilization means and permits scanned pulses to be passed to the multiplier 5 from shaper 3. When the movable system comes to rest a section of the control 23 passes the next end-of-scan pulse to condition a trigger so that the following end-of-scan will terminate the transmission of pulses to the multiplier and initiate the operation of the utilization means. This last full pulse is employed in the computer, to be discussed, to effect a computation based thereon.

In normal operation the scanner mechanism can be operated continuously and signals therefrom are transmitted through the shaper 3 to the multiplier 5 continuously until a computation is to be fed to the utilization means. The multiplier generates a train of ten successive pulses for each scan pulse fed it over line 4. Pulse generation in the multiplier occurs at a rate relative to the pulse rate from the scanner which enables an appropriate portion of those ten pulses to be transmitted to the counters before the next scan pulse is received. As shown in FIG. V, the multiplier consists of a chain of blocking oscillators 105 through 114 connected in series so that each is triggered by the trailing edge of a negative pulse from the preceding oscillator or, in the case of the first oscillator, from the shaper over lead 4. Taps 115, 116, 117 and 43 are provided from which output pulses can be derived in combinations constituting any number of pulses corresponding to the digits required in the multiplying factors (1 through 6 and 9). These output pulses are taken from the cathodes of the blocking oscillators. The first two cathodes are tied together and have a common resistor 119 to ground with a tap 115 at its cathode end so that pulses No. 1 and No. 2 are available to subsequent circuits. Similarly, resistor 120 is common to the third, fourth, fifth, and sixth oscillator cathodes so that pulses No. 3, No. 4, No. 5 and No. 6 can be derived from tap 116 associated therewith; resistor 121 and its tap 117 provide pulses No. 7 and No. 8 from corresponding oscillators 111 and 112; and resistor 122 with tap 43 supplies the ninth pulse and the hundredths carry clear actuation from the ninth oscillator 113. The tenth oscillator 114 provides the signal actuating the tenths carry clear function of the computer at tap 33.

These pulses are fed to the preset section 6, where, as shown in FIG. IV, the selected multiplying factor has established the number of pulses to be transmitted to the pulse amplifiers 15, 16, and 17 for each scan pulse. Since each multiplying factor in this combination is fixed, all of their digits can be set up in a single step. Zone selection switches ZLS, Z1S, Z3S, Z4S, Z5S are provided at a convenient location for the scale operator to accomplish the selection. These switches actuate relays ZL, Z1, Z3, Z4 and Z5 which have contacts arranged to establish a three digit multiplier. As will be more fully explained, these relays also are arranged to preset counters in the computer to the appropriate minimum values of postage and to activate a relay in the guard circuit 25. In order to systematically identify the switches, relays, and contacts all elements utilized in the operations relating to a given zone have their first two symbols identical, these symbols being ZL, Z1, Z3, Z4 and Z5 for local, first and second, third, fourth, and fifth zones, respectively. Similarly, the third symbol, except in the case of the relays where no third symbol is employed, indicates the function of the element as: S for selection switch; "—1" for the contacts setting up the reset connections establishing the initial value in the cents counter 8, represented as counter matrix 10 in FIG. I; "—2" for the contacts setting up the reset connections establishing the initial value in the dimes counter 9, represented as counter matrix 11 in FIG. I; "—3" for the contacts setting up the hundredths of a cent multiplying factor; "—4" for the contacts setting up the tenths of a cent multiplying factor; "—5" for the contacts setting up the cents multiplying factor; and "—6" for the contacts energizing relay 87 in the guard circuit. In the assumed case, zone selection switch Z3S for the third zone is closed to energize third zone relay Z3 and close the hundredths, tenths and units factor contacts for the third zone Z3–5, Z3–4 and Z3–3, respectively. The factor for the third zone is 0.0515. Lead 123 in FIG. IV feeds pulses to the units pulse amplifier 17. This lead is connected to lead 124 by Z3–3. Lead 124 is connected to the pulse generator 5 by conductors in cable 42 such that a total of five pulses are imposed on it as a result of each scan pulse. As described above each scan pulse causes one pulse to appear in line 43, two pulses on line 117, four pulses on line 116, and two pulses on line 115. The single pulse from line 43 and the four pulses from line 116 are passed to line 124 by rectifiers 125 and 126, respectively, to form the total of five. Similar combinations or exclusions by the remaining rectifiers shown apply one pulse to lead 127, two to 128, three to 129, four to 130, six to 131 and nine to 132. The tenth of a cent factor, one, is derived from lead 127 by contact Z3–4 which is connected to line 133 in cable 14 feeding pulse amplifier 16, and the hundredths of a cent factor, five, is fed from lead 124 through lead 134, and contact Z3–5 to line 135.

Operation of any other zone selection relay will set up the multiplying factor for that zone as described above.

Appropriate portions of each of the pulse trains from the hundredths, tenths and unit leads in the factor determining matrix 6 are fed to pulse amplifiers 15, 16 and 17, respectively, and thence to the counters as each scan pulse excites the train. These pulses are accumulated and added to those pulses of any preceding multiplier trains for that scan. The three pulse amplifiers 15, 16 and 17 are shown in FIG. VI for the three decades. Each corresponds to hundredths amplifier 15 comprising a pentode 136 having a control grid 137 which is coupled to the decade lead 135 so that the positive pulses thereon are amplified. The negative going signal appearing at plate 138 for each pulse is clipped by rectifier 139 whose anode potential is established by low impedance voltage divider 140. The pulses resulting are transferred to the counter 19, over lead 18 so that, in the example, the hundredths decade counter 19 receives five pulses for each scan pulse representing a pound on the scale. Simultaneously the tenths decade counter 21 receives one pulse from amplifier 16 over lead 20 for each scan pulse, and the units decade counter 8 receives five pulses from amplifier 17 over lead 22 for each pulse.

Assuming that the parcel to be weighed is greater than seevn but less than eight pounds, the scan train will comprise eight pulses. Each decade counter is capable of storing up to nine multiplier pulses. As will be described, the hundredths and tenths counters are each set to nine at the beginning of a scan by the first pulse so that these decades are filled to capacity and any fraction of a cent in a product will trigger the cents counter to the next cent. Each of the eight scan pulses feed five multiplier pulses to the hundredths counter 19 and one pulse to the tenths counter 21. Since the counters operate on the decimal system the first pulse of the multiplier train recycles the preset hundredths counter setting it at zero and thereafter that counter is recycled three additional times during the scan by the thirty-nine additional pulses transmitted over lead 18. The recycling operation also inserts a pulse in the signal to the next counter decade. Since counters 19, 21 and 8 receive their pulse trains simultaneously, precautions must be taken to avoid loss of the carry pulse by imposing it on the next stage at the same instant a train of multiplier pulses are applied. Carry storage sections 39 and 40 of FIG. VI avoid this difficulty by storing the carry pulse until the nine pulse train of the multiplier has been transmitted to the counters and then passing the carried pulse to them before the next train is transmitted. The carry storage function is provided by a flip-flop including triodes 141 and 142. When decade counter 19 is shifted from 9 to 0 it generates a negative output pulse. This pulse is impressed over lead 44 on the grid 143 of the normally conducting triode 142 causing the flip-flop to change to its abnormal state, cutting off triode 142 and instituting conduction in triode 141.

The trailing edge of the ninth pulse of the pulse generator train provides a negative going signal which is impressed on the grid 114 of normally non-conducting triode 141 over lead 43. If the flip-flop is in its normal state, this pulse has no effect. When the flip-flop has been triggered to its abnormal state by a carry pulse on lead 44, the conduction of triode 141 is terminated by the negative going signal. Cutoff triode 141 gives rise to a positive going signal at its plate 145 which initiates conduction in triode 142 by raising the potential of grid 143, and transmits a positive pulse on lead 45 to grid 146 of pentode 147 in pulse amplifier 16. The signal to pulse amplifier 16 causes a carry operation by setting the next counter decade 21, that is fed by amplifier 16 over lead 20, ahead one digit.

The carry operation from the hundredths decade thus follows the ninth pulse of the multiplier train at the instant that pulse decays and the resulting carried pulse is fed from the pulse amplifier 16 for the tenths decade in the same manner as the signals therefrom arising from the tenths input lead 133 from preset 6. All tenths signals are transmitted over lead 20 tapped to the plate 148 of pentode 147 in the same manner as from plate 138 of pentode amplifier 136 for the hundredths stage.

Carry storage must also be performed between the tenths and units decade to discriminate between unit pulses from preset 6 and the carry pulse from the filled tenths counter 21. A carry-storage flip-flop 40 corresponding to flip-flop 39 is provided. It differs from the preceding stage 39 in that it is triggered from the trailing edge of the tenth pulse of the train from the pulse generator 5 over lead 33 from the tenth blocking oscillator to clear any carry signal which may have been imposed on the stage from lead 46 during that pulse train. The clearing operation passes its carry pulse over lead 47 to the grid of the units decade pulse amplifier 17 where it is combined in the pulse train fed thereto over lead 123 at the end of that train and passed on the units counter 8 over lead 22.

Since the multiplying factor in the illustration has only three digits, only three counter stages receive their pulses from the preset 6 and any additional counter decades receive pulses from their preceding decade. Accordingly, the magnitude of the signals is sufficient so that a pulse amplifier is unnecessary between these additional counter stages. The single source of pulses for those counters, the preceding counter, eliminates the need for the storage of carry pulses or their combination with multiplier pulses. As shown in FIG. I units counter 8 when filled by a count of nine is reset to zero by the next pulse and transmits a carry pulse over lead 149 directly to tens counter 9. Similarly the tenth count on tens counter 9 sets it at zero and applies a count to hundreds counter 38 over lead 150.

The illustrated embodiment employs five counters 19, 21, 8, 9 and 38 enabling it to store a five digit number. The number represents the value of the computed postage in dollars to four decimal places to a maximum of $9.9999. The general configuration of each counter, as shown in FIG. VII, comprises four binary stages for each decade.

The hundreds counter 38 is shown in FIG. VII. As will be explained, the remaining counters differ therefrom by virtue of the preset features they embody. The binary stages are commonly known as flip-flop circuits. The first flip-flop 160 of counter 38 will be discussed as typical. It comprises, as is well known, a common plate resistor 161, individual plate resistors 162, 163, 164 and 165, plate to grid resistors 166 and 167, and grid to ground resistors 168 and 169. In addition, cathodes 170 and 171 are tied together and connected to ground through a common cathode resistor 172 which is by-passed with a condenser 173. The sections of the flip-flop are interconnected with grid 174 of cathode 170 connected to the junction between resistors 166 and 168 while the plate 175 of that triode is connected between the plate and grid resistors 164 and 167. Likewise, grid 176 is tied between resistors 167 and 169 while plate 177 is connected between resistors 162 and 166. Negative going input pulses are transmitted to the counter over lead 150 from the tens counter 9. Output pulses from the counter stage are transmitted over output lead 178 which may be the input lead for the next stage. The negative input pulse is applied equally to plates 175 and 177 at the junction between common resistor 161 and individual resistors 163 and 165. The output voltage pulse is taken from the plate 175 at the junction between resistors 164 and 167.

The flip-flop is bi-stable so that the application of a sharp negative pulse on lead 150 causes cut off of the conducting triode and initiation of conduction in its cutoff counterpart. When grid 174 is positive with respect to its cathode 170, curent flows through resistors 164 and 165 depressing the potential of grid 176 to cut off its triode. The voltage between resistors 162 and 166 is therefore high and the charge on condenser 179 is correspondingly high while that on condenser 180 is relatively smaller. A negative impulse on lead 150 drives both anodes 175 and 177 and grids 174 and 176 negative. Plate 175 is cutoff and the junction between resistors 164 and 167 goes positive driving grid 176 positive with respect to cathode 171. Thus, as the input pulse diminishes on the plate resistors, plate 177 draws current to impose a negative signal at the junction between resistors 162 and 166 maintaining grid 174 cutoff. The next negative pulse on lead 150 reverses the operation, initiating conduction in plate 175 and imposing a sharp negative going pulse on output lead 178 and thence to the next flip-flop stage 159. Two input pulses thus result in one output pulse.

Four stages in a binary counter normally have a sixteen pulse repetition cycle. Since the count from these counters is to be read in a decimal system the counter is recycled after ten pulses by taking feedback connections from the plate 158 of the left side of the third flip-flop 181 to the grid 182 of the right side of the second flip-flop and from the plate 183 of the right side of the fourth flip-flop 184 to the grid 185 of the left side of the third flip-flop 181. These feedback connections advance the count at four to the normal sixth binary count and the count at six to the twelfth normal binary count so that the tenth pulse sets the counter at its sixteenth normal binary count filling it. As shown the decimal system is coded as follows, + indicating the conducting state for a side of a flip-flop and 0 the nonconducting state:

| Decimal No. | 1st flip-flop | | 2nd flip-flop | | 3rd flip-flop | | 4th flip-flop | |
|---|---|---|---|---|---|---|---|---|
| | left side | right side | left side | right side | left side | right side | left side | right side |
| 0 | + | 0 | + | 0 | + | 0 | + | 0 |
| 1 | 0 | + | + | 0 | + | 0 | + | 0 |
| 2 | + | 0 | 0 | + | + | 0 | + | 0 |
| 3 | 0 | + | 0 | + | + | 0 | + | 0 |
| 4 | + | 0 | + | 0 | 0 | + | + | 0 |
| 5 | 0 | + | + | 0 | 0 | + | + | 0 |
| 6 | + | 0 | 0 | + | 0 | + | 0 | + |
| 7 | 0 | + | 0 | + | 0 | + | 0 | + |
| 8 | + | 0 | + | 0 | 0 | + | 0 | + |
| 9 | 0 | + | + | 0 | 0 | + | 0 | + |

This code is employed in all five counters. As a servicing aid, each counter is provided with indicator lamps 186 which provide a visual indication that they are operating. When an even number of pulses is stored, the left side of the first flip-flop 160 is conductive and the junction between resistors 162 and 163 is at a higher potential than that at the junction between resistors 164 and 165; thus, line 187 is at a higher potential than line 188. When the left side of every flip-flop is conductive, as with a zero count, the greatest potential is developed across lamp 186-0, hence it glows the brightest. Line 189 is at a lower potential than any other line to which lamps connected to line 187 are cross connected since it is connected to two parallel conducting sections, the left side of the second and fourth flip-flops 159 and 184. At the count of five, as with all other odd counts, the right side of the first flip-flop is conductive so that line 188 is at a higher potential than line 187; further, the right side of the third flip-flop 181 and the left side of the fourth flip-flop 184 are also conducting to place line 190 connected thereto at a lower potential than any other supplying a lamp connected to line 188 so that lamp 186-5 glows brightest to indicate a count of five.

The multiplier and counters function with each scan until the utilization control 30 is operated by control 23. Thus, the accumulated computation of the combination must be reset to its minimum value with each scan. Reset occurs at the beginning of each scan in response to signals derived from leads 35 and 37 of shaper 3 as described. The resetting operation requires a positive pulse from a low impedance source to reset hundredths counter 19 and tenths counter 21 to nine and hundreds counter 38 to zero. In postal computations the computer must be set at ninety-nine hundredths of a cent since any fraction of a cent in excess of an even cent must be added as an extra cent. The reset is accomplished in the hundreds or dollars counter 38 as shown in FIG. VII by placing the left side of each flip-flop stage of the counter in its conductive state so that no output signal exists on the ones, twos, fours or eights output leads 191, 192, 193 and 194, respectively. This is the zero signal from the counter as indicated from the above table. It is set in by pulsing lead 37A with a positive pulse from lead 37 of the shaper 3. The general counter configuration of FIG. VII is further modified for counter 38 by connecting lead 37B to ground.

Counters 19 and 21 are set at nine by the positive pulse from the shaper output lead 37 by connecting their leads 37B as shown in FIG. VII to shaper lead 37 and grounding their 37A leads. This imposes a positive pulse on the grid of the right side of each flip-flop and insures conduction in the right side of each flip-flop stage to signify a nine count. When the general counter configuration is employed for the hundredths and tenths orders, leads 18 and 20 from appropriate pulse amplifiers 15 and 16 are respectively substituted for input 150 and only the output lead 195 is effective, it being connected to lead 44 to carry-storage stage 39 for hundredths counter 19 and to lead 46 to carry-storage 40 for tenths counter 21.

The signal on lead 37 is also employed as a safeguard against false operation of the carry storage sections 39 and 40 so that these sections are placed in their normal state at the beginning of each scan. Thus, the control grid 143 of the right side of the flip-flop in carry-storage 39 is pulsed over lead 196, shown in FIG. VI, connected to lead 37 to place triode 142 in conduction. The counterparts are similarly conditioned in carry-storage stage 40 by means of lead 197 connected to lead 37.

Units and tens counters 8 and 9 each must be reset to one of a plurality of possible values which are established by the zone selector means of FIG. IV, schematically represented in preset 6 of FIG. I. In addition to setting up the multiplying factor, the operation of zone selection relays ZL, Z1, Z3, Z4 or Z5 also set up the desired initial conditions in these counters. These initial counts are the minimum postage for the first pound in the selected postal zone. The third zone minimum of the example is $0.23 hence cents counter 8 must be set to three and dimes counter 9 to two.

Each begin-scan signal from lead 35 of shaper 3 is fed to the reset circuit 34, shown in detail in FIG. IV, to drive a high impedance pulse generator whose first section includes a one shot multivibrator built around a dual triode 200. The multivibrator is triggered by the positive begin-scan signal and generates a relatively long positive pulse which is amplified and inverted in phase in two triode stages 201 and 202 joined in parallel. Normally the right side 203 of tube 200 is conducting. The positive signal on 35 raises grid 204 to initiate conduction in the left side 205 and reduce the potential at 206 connected to grid 207 of the right side 203 while raising the potential of cathode 208 to cut off right side 203. This imposes a positive pulse on the grids 209 and 210 of triodes 201 and 202 through condenser 211. When the charge on timing condenser 12 has leaked off sufficiently, the multivibrator snaps back to its normal condition and the potential of grids 209 and 210 is depressed. Thus, a negative pulse of a desired duration, e.g., a −200 volt pulse of 150 microseconds having a rise time of 10 microseconds is imposed on circuits connected to reset output lead 36.

The negative reset pulse generated at the beginning of each scan is applied to appropriate flip-flop control grids in counters 8 and 9 by circuits established by the zone relays ZL, Z1, Z3, Z4 and Z5. In the example, Z3–1 is closed by energizing relay Z3 to apply the reset pulse to line 213 in FIG. IV connected to line 214 shown in FIG. VIII and thence to the left grid 215 and 216 of the first and second flip-flops 217 and 218 and the right grids 219 and 220 of the third and fourth flip-flops 221 and 222 of units or cents counter 8. Since this pulse is negative it sets the respective sections in their nonconducting state presetting a count of three according to the above code. Hence, the first cents pulse fed to this counter over its input lead 22 will advance the count to four.

Similarly counter 9 is set at a count of two by closure of contact Z3–2 in line 223 of FIG. IV connected to reset line 224 as shown in FIG. IX to insure that the right sections of the first, third and fourth flip-flops, 225, 226 and 227 respectively, and that the left section of the second flip-flop 228 are all nonconducting by pulsing their respective control grids 229, 230, 231 and 232 negatively.

By reference to the above code it can readily be appreciated that corresponding connections are established in matrixes 10 and 11 in FIG. IV to set up in counter 8 a local minimum count of eight when ZL–1 is closed to line 233 and a count of one in counter 9 when ZL–2 connects 36 to line 234. Operation of first zone relay Z1 connects reset output lead 36 to line 214 through contact Z1–1 to establish a three count in counter 8 and connects lead 36 to line 224 by contact Z1–2 to set up a two count in counter 9. The fourth zone relay Z4 closes contact Z4–1 to apply reset pulses to line 235 connected to counter 8 so as to reset to a count of four and contact Z4–2 in line 236 to reset two in counter 9 over lead 224. Zone five relay Z5 sets up counter 8 for a reset of six through contact Z5–1 and lead 237 while contact Z5–2 sets up a count of two on lead 238 to line 224 of counter 9.

A useful output is derived from the counters when certain conditions in the combination are coincident. These conditions are sensed in control 23 and are transmitted to the utilization circuits over lead 32 and to bar the passage of further scan signals through shaper 3 over lead 30. As set forth above these conditions are the end of motion in the scale, the operation of a zone selection switch, and the registration after the first two conditions of two successive end-of-scan signals. When the second end-of-scan signal operates the gate in shaper 3, the counters are set at the value computed from the scan occurring between the two preceding end-of-scan pulses. The values in the counters are translated into mechanical displacement by an electromechanical decoder arranged to drive the cents, dimes and dollars levers of a commercial postage meter.

The decoder employed in this system is disclosed in detail in the above C. E. Adler application. Generally, it comprises three banks each having four movable code sectors and a searching mechanism which can be latched at but one position for any combination of sector positions. The code is arranged to correlate with the setting means on a postage meter. Each bank of the decoder is connected to a counter so that the unit or cents counter 8 actuates the code sectors in a first decoder bank, the tens or dimes counter 9 actuates the code sectors in a second bank and the hundreds or dollars counter 38 actuates the third bank.

Each counter output lead carries an output signal to a driver (not shown) consisting of a triode amplifier arranged to be cut off when no signal is present on its input lead and to be heavily conducting in response to a signal on its input lead. For example, if the count in unit counter 8 were zero no signal would appear on its one, two, four or eight output terminal 240, 241, 242 and 243, respectively, and the four driver triodes connected to these terminals would be cut off.

Sector positioning solenoids (not shown) are operated by the driver triodes when they are conducting. These solenoids shift the sectors from a first to a second position to establish a latching position in the decoder determined by the combination of shifted and unshifted sectors.

Thus, any output from zero to nine can be developed from counter 8 by energizing combinations of output terminals 240, 241, 242 and 243, for counter 9 at terminals 244, 245, 246 and 247, and for counter 39 at terminals 191, 192, 193, 194 and is translated to a coded position for permutation sectors through driver triodes and sector solenoids. Once the sectors have been positioned the search mechanisms for the three banks are caused to scan their positions and each latch when indexed properly for the code applied to the individual banks.

Referring again to FIG. III, when relay 97 is actuated by the control gate it actuates clutch release solenoid 98 to drive the search mechanisms of the electromechanical decoder by coupling a continuously rotating shaft (not shown) to drive means for the search mechanisms. This shaft is driven through a single rotation of 360 degrees to index the search mechanisms on the permutation sectors in the decoder. The shaft rotation also actuates switches by means of a pair of cams as shown in FIG. X.

In FIG. X clutch release solenoid 98 of FIG. III actuates single rotating clutch 250 to initiate the rotation of shaft 251 through 360° and thereby drive a gear train 252 and in turn shaft 253. The drive for search mechanisms, cams (not shown), are mounted on shaft 253 together with contact actuating cams 254 and 255.

In recapitulation of the illustrative embodiment of the invention reference is made to the sequence diagram of FIG. XI representing the instants of operation of some of the elements in the system. Initially a package is placed upon the load receiver of a weighing device as indicated at line A at instant $a$ and a zone selection is made by manually closing a zone selection switch ZLS through Z5S at instant $b$ in line B. Zone selection can be effected at any time and the operation of the system will be barred until it is made, however, its is assumed that the selection is completed before the load receiver comes to rest. When the motion in the system has reached a level permitting an accurate determination of the weight as at $c$ in line C, gate control 23 is conditioned by the next end of scan pulse, those pulses extending below line D, at instant $d_e$ to enable it to initiate a utilization cycle upon the reception of the next end of scan pulse at instant $d_e'$. A complete scan occurring between begin-scan pulse $d_b'$ and $d_e'$ is fed to the computer in the interval between $d_e$ and $d_e'$ and is accumulated in the counters after generating a count corresponding to the appropriate zone constant plus the product of the zone multiplying factor and the weight in excess of a pound of the package. Initiation of the utilization cycle bars the transmission of additional scans to the multiplier until the postage meter has been set to produce a label of the appropriate value and the meter print cycle has been initiated. The initial lockout is coincident with the release of a single revolution clutch in a mechanical decoder, both resulting from the operation of a one-shot multivibrator in control circuit 23 which operates for a given interval as represented by $e$—$e'$ of line E. Instant $e$ in essence coincides with instant $d_e'$ as does instant $f$ representing the energization of clutch release solenoid 98 in line F. Shortly after instant $e$, cam 255 of the decoder disengages follower 257 permitting contacts 263, 264 and 265 to close energizing zone release solenoid 267 at instant $g$, cam lockout of scan pulses to the multiplier at $h$ of line H, and activation of guard circuit 25 at $j$ of line J. As zone release solenoid 267 functions it drops out relay 87 as represented at instant $b'$ deenergizing clutch release solenoid 98 at instant $f'$ and zone release solenoid 267 at instant $g'$. Near the end of the single revolution of the clutch coupling shaft 253 to its drive, cam 254 closes contacts 274 to operate the print motor of the postage meter for an interval from $k$ to $k'$ in line K. During this interval, scan signal lockout and the guard circuit are deactivated as at instants $h'$ and $j'$, by the reopening of contacts 264 and 265, respectively.

In the event the zone selection was reestablished after zone release should have occurred, as by the inadvertent closure of a zone selection switch, the guard circuit would be activated by energizing relay 89. Guard circuit functions are represented in dotted lines in FIG. XI. Relay 89 is energized at instant $m$ in line M at the time a new zone selection is made at $b''$ to cancel the current computation and decoding cycle by reenergizing zone release solenoid 267 at $g''$, releasing the scan lockout $h''$ and establishing a holding circuit for guard relay 89 in line J. The system must then be reconditioned by operation of a reset, as at instant $n$ in line N to drop out relay 89 at $m'$ by opening its holding circuit at $j''$ whereby the zone release is dropped out at $g'''$ and the clutch can again be released.

Cams 254 and 255 mounted on the shaft adjacent each other are arranged to engage spring finger followers 256 and 257 displaced with respect to each other along the shaft axis in alignment with their respective cams. A pile up of leaf springs 258 through 260 mounted in a block 266 of insulating material are secured on a base structure (not shown) common to that supporting shaft 253. When shaft 253 is at rest, before the initiation of the cycle of the shaft, cam 255 engages follower 257 on spring 258 to deflect spring 258 and springs 259 and 260 connected thereto by pins 261 and 262 of insulating material. The deflection of springs 258, 259 and 260 opens contacts 263, 264 and 265. When the rotation of shaft 253 is initiated, the high portion of cam 255 is moved away from follower 257 permitting the contacts 263, 264 and 265 to close.

Contacts 263, shown in circuit with the multivibrator including triodes 92 and 93 of FIG. III, upon closing connect lead 30 to shaper 3 to ground, thereby enabling triode 62 to conduct so that it depresses the potential of grid 58 to lockout the operation of the Schmitt trigger, triodes 56 and 57, which passes pulses from the scanner through the shaper 3 to the multiplier 5. Cam 255 closes this contact about 50 milliseconds after clutch release solenoid 98 is energized by the firing of the multivibrator energized relay 97. Thus, the lockout of signals through the Schmitt trigger by the multivibrator, maintained operative for 150 milliseconds, is overlapped by the lockout of those signals by closure of contact 263. The alteration of the values in the counters and the settings of the decoder is prevented by this combination from the initiation of the firing of the multivibrator until the shaft 253 driving cam 255 has passed through essentially a full revolution.

Contacts 264 are closed by the rotation of cam 255 to energize zone release solenoid 267 in FIG. III by connecting it through rectifier 268 to alternating current source 269. Zone release solenoid 267 when energized opens the closed zone selection switch ZLS, Z1S, Z3S, Z4S or Z5S in FIG. IV as by a mechanical reset (not shown) to deenergize and drop out the zone relay in circuit therewith.

Contacts 265 shown in FIG. III enter into the guard circuit logic by completing a portion of the energizing path for guard relay 89 when they are permitted to close. At the time these contacts close the zone selection relay 87 normally is deenergized opening its contact 87–4 by virtue of the opening of zone relay contacts ZL–6 through Z5–6. However, if the zone selection switch has been maintained depressed an excessive interval so that operation of the zone release is ineffective, or if a second zone selection button is closed, the zone selection relay remains energized completing an energizing circuit from ground through lead 270, the actuating coil 89, lead 271, contact 87–4, contacts 265, and lead 272 to contact 97–1. If multivibrator actuated, control relay 97 has dropped out at this time, contact 97–1 is closed to provide a path from lead 272 through lead 100, source 85, and standby switch 99 to ground. This path is available throughout the utilization cycle up to the time the postage meter printing operation is completed since postage meter print motor relay 273 is energized during the printing to provide a parallel path around cam operated contacts 265 by closing its contacts 273–1.

Before proceeding with a detailed consideration of the guard circuit functions, consider the operation of contacts 274 by the cam 254. Near the end of a cycle of rotation of shaft 253 as measured from the point clutch 250 is actuated, the setting of the postage meter has been accomplished by the decoder mechanism, hence, all that remains to be done is the actuation of the printing mechanism in the meter. Cam 254 is arranged to engage follower 256 after the completion of the postage meter setting and close contacts 274 so that the print mechanism in the meter is actuated. During this actuation relay 273 is energized and contacts 273–1 closed. Printing is completed and the motor and relay 273 deenergized immediately preceding the end of the utilization cycle by the disengagement of cam 254 from follower 256 to open contacts 274.

The guard circuit prevents a new computation cycle from starting before the previous selecting and printing cycle has been completed. If functions to energize relay 89 during the interval between the opening of relay 97 and the completion of the selection and printing cycle if a zone relay contact ZL–6 to Z5–6 is closed to open the path through which grid 88 is grounded by opening contacts 89–1, to bar release of the clutch by opening the energizing circuit for clutch release solenoid 98 at contacts 89–2, to maintain the zone release solenoid 267 energized by closing contact 89–3, and to seal itself in by closing contacts 89–4. The seal in circuit for guard relay 89 extends from ground through closed switch 99, source 85, lead 100, lead 84, lead 275, manual reset switch 276, guard relay contacts 89–4, lead 271, actuating coil 89, lead 270 and ground. Once energized, relay 89 must be released by depressing a reset button to open switch 276, thereby insuring that a malfunction is brought to the attention of the operator.

When the weighing, computing and printing system of this invention is applied to the determination of postal fees and preparation of printed postage labels, provision should be made for alteration of both the constants and multiplying factors in anticipation of changes in postal rates. FIG. XII shows a block diagram of a fragment of the computer embodying such a provision in the form of a plug-in computing factor matrix 280 and a plug-in preset or constant matrix 281. The matrix 280 is shown between the pulse generating multiplier 5 and the factor selector 282 represented in FIG. IV by the −3, −4 and −5 contacts of relays ZL, Z1, Z3, Z4 and Z5; thus, it can be considered to correspond to a portion of the preset circuit 6 of FIG. I or the pulse combining matrix in the lower portion of FIG. IV. Similarly, matrix 281 corresponds to the counter matrices 10 and 11 of FIGS. I and IV connected between the selector 283 including the −1 and −2 contacts of selector relays ZL to Z5 as fed reset pulses over lead 36 from reset pulse generator 34 to the several input terminals of the decade counters 284. These plug-in matrices can be disconnected and removed simply by unplugging their connectors to the adjoining circuits and can be replaced by matrices having corresponding physical structures and modified electrical configurations whereby the operation of a selector will apply a different combination of pulses to a counter input, in the case of a factor matrix, or will apply a reset pulse to a different reset terminal of the counter, in the case of the preset matrix. Since the occasion for a change may arise from but a single change in a factor or constant, the matrices can advantageously be separate plug-in units or as will be described below they can be integrated into a single unitary structure. It is desirable to position the plug-in unit or units within a casing or housing for the components so that they cannot be altered by operating personnel and are available only to maintenance or repair personnel.

FIG. XIII shows one form of plug-in computing factor matrix including four output terminals 43, 115, 116 and 117 from the pulse generator or multiplier 5 connected by pressure type connectors 286, 287, 288 and 289 to input leads 290, 291, 292 and 293 respectively. Each lead receives a fixed number of pulses from the generator through terminals 43, 115, 116 and 117 (1, 2, 4 and 2 pulses respectively). These pulses are combined in the diode matrix mounted on the supporting plug-in structure 294 to feed from one to nine pulses to leads 301 to 309 respectively and those pulses are fed to output leads, all in the manner described with respect to FIG. IV. A greater number of output connections are shown in FIG. XIII than in FIG. IV since the illustrative plug-in matrix is arranged to establish factors for eight postal zones wherein the sixth, seventh and eighth zones require a four order factor (11.95, 15.20, and 18.05 cents respectively). These added zones accordingly, require selection relays (not shown) corresponding to relays ZL through Z5 of FIG. IV each actuating relay contacts Z6–3, Z7–3 and Z8–3 for the hundredths factor connected to lead 311 to the hundredths decade counter, contacts Z6–4, Z7–4 and Z8–4 connected to lead 312 to the tenths decade counter, contacts Z6–5, Z7–5 and Z8–5 connected to lead 313 to the cents decade counter, and contacts Z6–7, Z7–7 and X8–7 connected to lead 314 to the dimes decade counter. Note that this arrangement requires an extra carry-storage stage (not shown) between the cents and dimes counter.

Connection is made between the pulse feeding leads 301 to 309 and the selector input terminals which are connected to the relay contacts by means of pressure type contacts 315 which may be plug and jack combinations or their equivalents as in the case of connectors 286 to 289.

As an alternative to the above plug-in structure the diode matrix can be incorporated as a permanent portion of the computer and pressure type electrical couplings can be supplied in leads 301 to 309 so that the interconnections between those leads and the connectors 315 are all that require alteration when a rate change is to be effected.

Details of a preset matrix for establishing a predetermined constant, advantageously at the initiation of a computing cycle, are shown in FIG. XIV. The separable structure of that combination includes an array of interconnections arranged to be introduced between the relay contacts of the −1 and −2 group as illustrated in FIG. IV and the reset terminals to the electronic counters characterized by terminal 214 of the counter, shown in FIG. VIII. It should be noted that not all reset terminals are shown on the illustrated computers and that additional terminals and reset circuits would be added to accommodate the added zones in the same manner as terminals 214, 233, 235 and 237 of FIG. VIII. As with matrix 280, matrix 281 can be interposed at other points, for example at a point intermediate reset pulse generator 34 and selector 283. Structurally, the separable structure corresponds to that of FIG. XIII in comprising a supporting base 316 such as a circuit board supporting suitable cross connections constituting the preset matrix and a group of connectors 317 such as cooperating plugs and jacks or other pressure type electrical connections to engage output terminals from zone selection relay contacts ZL–1 to Z8–1 and ZL–2 to Z8–2. These connectors 317 are connected to the matrix input. The output terminals of the matrix 218 are connected to reset input terminals of units decade counter 8 and tens counter 9 by means of a group of pressure type electrical connectors 318. Thus, with the matrix array shown, the counters are reset to the following values by a reset pulse when a zone selection has been made to establish the postage minimum for that zone:

| Zone selection: | Reset or constant |
| --- | --- |
| Local | $0.18 |
| 1 and 2 | 0.23 |
| 3 | 0.23 |
| 4 | 0.24 |
| 5 | 0.26 |
| 6 | 0.28 |
| 7 | 0.30 |
| 8 | 0.32 |

However, if the minimum were changed, it would be a simple matter to substitute a new board 316 bearing a new matrix establishing different interconnections such as that establishing a value of nine in the units counter for the local zone selection through contact ZL-1 where that rate is changed to $0.19.

One form which the matrices can take is that of a printed circuit board wherein conducting foil cross connections 319 are bonded to an insulating board structure 320 as is well known and contact strips 321 are embedded in or otherwise secured to the edge of the board as shown in FIG. XV. Contact strips 321 can be connected electrically to spring finger contacts 322 mounted in sockets 323 arranged to receive the strip bearing ends of the board 320 by insertion of those ends into the sockets. Proper indexing of fingers and strips is accomplished by causing the ends 324 of the sockets 323 to confine the transverse position of the sides 325 of the board 320 with a tolerance less than the thickness of the boards. Leads to the fixed circuits can be connected to terminal extensions 326 of the sockets as by soldering.

Alternatively the matrices can be in the form shown in FIG. XVI wherein a structure corresponding to a unitary plug and socket 327 provides the interconnections from a multiple plug 328 connected to a cable 329 containing leads from one circuit component to another piece of equipment through a socket 330 including a multiplicity of jacks 331 each connected to leads in a cable from that other equipment. It is to be recognized that the jack and plug structures can be interchanged. The interconnecting matrix is housed within the body 327 and cross connects individual jacks 332 and plugs 333 therein in an appropriate manner. The body 327 can be enlarged to encompass the pulse combining rectifier matrix as well as the series and parallel type of connections of FIG. XIII or as shown in FIG. XVII several reset and factor establishing matrices can be combined in a unitary plug-in structure 328.

In FIG. XVII unitary structure 328 is connected to a chassis 329 including selectors ZL through Z8 by plugs 330 entering jacks 331 on the chassis to enable it to be physically separable therefrom. The matrices for reset of two counter decades and for setting up multiplying factors are housed in 328 and are connected to the counters and multiplier by multiple plugs 332, 333 and 334 engaging multiple jacks 335, 336 and 337 respectively. Interconnection of the plugs with their respective circuits, input and output terminals, is realized through cables 338, 339 and 340.

The preceding description has been directed to a specific utilization of the features of this invention; however, the invention is not so limited. It is applicable to other combinations of weighing scales or condition responsive devices, to computers employing other components, and to other forms of utilization means than the postal meter shown. Further, while only certain digits were required in the multiplying factors and only three digit factors were illustrated it is to be appreciated that it would involve a simple modification derived from the example herein to include all decimal digits and to increase the number of orders in the factors. Similarly while only two counters of five were provided with preset count selecting means whereby the initial value in the counters could be chosen from a number of possible counts, all counters might be so arranged. The number of counters might be chosen in accordance with the needs of the particular application on the basis of the present teachings.

In view of the above it is to be understood that the disclosed embodiment is to be interpreted only as illustrative of the invention and not in a limiting sense inasmuch as one skilled in the art might readily modify the invention or utilize it in other applications without departing from its spirit or scope.

What is claimed is:

1. In combination a condition responsive mechanism, a calculating mechanism, means repetitively translating a signal from said condition responsive mechanism to a form for utilization by said calculating mechanism, means transmitting the translated form of said signal to said calculating mechanism, means to define a complete signal, means to select and to establish a computing factor and a correlated constant in said calculating mechanism, means responsive to the existence of a predetermined state in said condition responsive mechanism, and means to bar the transmission of the translated form of said signal to said calculating mechanism upon the definition of a complete signal initiated subsequent to the operation of said means to select said factor and to the sensing of said predetermined state in said condition responsive mechanism.

2. In combination a condition responsive mechanism, a calculating mechanism, means repetitively translating a signal from said condition responsive mechanism to a form for utilization by said calculating mechanism, means transmitting the translated form of said signal to said calculating mechanism, a utilization mechanism responsive to the output of said calculating mechanism, means to define a complete signal, means to select and to establish a computing factor and a correlated constant in said calculating mechanism, means responsive to the existence of a predetermined state in said condition responsive mechanism, means to bar the transmission of the translated form of said signal to said calculating mechanism upon the definition of a complete signal initiated subsequent to the operation of said means to select said factor and to the sensing of said predetermined state in said condition responsive mechanism, and means initiating the response of said utilization mechanism upon the operation of said signal barring means.

3. In combination a condition responsive mechanism, a calculating mechanism, means repetitively translating a signal from said condition responsive mechanism to a form for utilization by said calculating mechanism, means transmitting the translated form of said signal to said calculating mechanism, means to select and to establish a computing factor and a correlated constant in said calculating mechanism, means to sense the attainment of a given degree of quiescence in said condition responsive mechanism, means to define a complete signal, and means to bar the transmission of the translated form of said signal to said calculating means upon the definition of a complete signal initiated subsequent to the operation of said selection means and to the sensing of said given degree of quiescence.

4. In combination a condition responsive mechanism, a calculating mechanism, means repetitively translating a signal from said condition responsive mechanism to a form for utilization by said calculating mechanism, means transmitting the translated form of said signal to said calculating mechanism, a utilization mechanism responsive to the output of said calculating mechanism, means to select and to establish a computing factor and a correlated constant in said calculating mechanism, means to sense the attainment of a given degree of quiescence in said condition responsive mechanism, means to define a complete signal, means to bar the transmission of the translated form of said signal to said calculating means upon the definition of a complete signal initiated subsequent to the operation of said selection means and to the sensing of said given degree of quiescence, and means initiating the response of said utilization mechanism upon the operation of said signal barring means.

5. A combination in accordance with claim 2 wherein said condition responsive mechanism is a weighing device and said utilization mechanism is a postage meter.

6. In combination a weighing mechanism, a movable element which is displaced as a function of the load applied to said weighing mechanism, means translating the displacement of said movable element into a train of electrical pulses having a number of pulses proportional to the degree of displacement, means sensing motion of said movable element, a pulse generator generating a fixed number of pulses in response to each pulse of said train following the first pulse, a pulse counter, a plurality of means each transmitting a given fraction of the fixed number of pulses from said generator to said counter, a plurality of means each establishing a given signal in said counter corresponding to a given number of pulses in response to the first pulse of said train, means for selecting and rendering effective one of said pulse transmitting means and one of signal establishing means, and a utilization means coupled to said counter and rendered effective in response to a signal from said motion sensing means indicating the reduction of motion in said movable element to a predetermined level.

7. In combination a weighing mechanism, a movable element which is displaced as a function of the load applied to said weighing mechanism, means translating the displacement of said movable element into an electrical signal having a form which is a function of that displacement, a pulse geneartor generating a number of pulses which is a function of said signal form, a pulse counter, a plurality of means each transmitting to said counter a given fraction of the number of pulses from said generator, a plurality of means each establishing a condition in said counter corresponding to a given number of pulses in response to an electrical signal from said translating means, means for selecting and rendering effective one of said pulse transmitting means and one of said counter conditioning means, and a utilization means coupled to said counter.

8. A combination as recited in claim 7 including means detecting motion of a predetermined level by said movable element and controlling the operation of said utilization means in response to said level.

9. In combination a condition responsive device, an electrical translator translating the response of said device to an electrical signal having a form which is a function of said response, signal storage means, a plurality of means each arranged to transmit a given portion of the electrical signal to said storage means, a plurality of means each for conditioning said signal storage means to a state characteristic of a given signal, and a plurality of means each operating independently of said signal and arranged to select and render effective a given signal transmission means and a corresponding storage conditioning means.

10. In combination a condition responsive device, an electrical translator translating the response of said device to an electrical signal having a form which is a function of said response, signal storage means, a plurality of transmission paths each arranged to transmit a given portion of the electrical signal to said storage means, a plurality of means each for conditioning said signal storage means to a state characteristic of a given signal, a plurality of manually operated selection switches, a selection relay individual to each selection switch and energized upon operation of its switch, a first circuit established by the operation of a selection relay to couple said translator to said storage means over a given transmission path, and a second circuit established by the operation of said selection relay to couple a given one of said conditioning means to said storage means.

11. In combination a condition responsive device, an electrical translator translating the response of said device to an electrical signal having a form which is a funciton of said response, signal storage means, a plurality of transmission paths each arranged to transmit a given portion of the electrical signal to said storage means, a plurality of means each for conditioning said signal storage means to a state characteristic of a given signal, a plurality of manually operated selection switches, a selection relay individual to each selection switch and energized upon operation of its switch, a first circuit established by the operation of a selection relay to couple said translator to said storage means over a given transmission path, a second circuit established by the operation of said selection relay to couple a given one of said conditioning means to said storage means to impress a signal through said second circuit upon the initiation of said translator signal, and means to deenergize the operated selection relay upon the termination of said translator signal.

12. In combination a condition responsive device, an electrical translator repetitively generating a signal which is a function of the response of said device, means generating electrical pulses proportional to said translator signal, a plurality of cascaded trigger circuits responsive to pulses from said means and constituting a pulse counter, a first means for selectively conditioning said trigger circuits to correspond to a first given number of pulses, second means for selectively conditioning said trigger circuits to correspond to a second given number of pulses, means for selecting and rendering effective one of said conditioning means and means for actuating said selected conditioning means at the initiation of each signal generation.

13. In combination a weighing scale, a member movable in said scale as a function of the applied load, means developing a train of electrical pulses having a number of pulses proportional to the displacement of said movable member, a pulse generator for generating a series of pulses in response to pulses of said train, means for selecting certain pulses of said series, a counter section for each of a plurality of orders of the pulse count, means for applying pulses from said selecting means to a plurality of said counter sections, means for establishing any one of a plurality of initial pulse counts in each of a plurality of counter sections, means for selecting an initial pulse count for certain of the counter sections, means for setting said counter sections at the selected initial pulse counts upon initiation of a train of electrical pulses, a motion detector for said movable member which issues a signal upon said member attaining a predetermined level of motion, means defining the first complete pulse train subsequent to said signal from said motion detector, a utilization means responsive to the count in a counter section upon the termination of said defined pulse train, and means to bar the transmission of pulse trains to said pulse generator during the operation of said utilization means.

14. In combination a condition responsive device, an electrical translator coupled to said device to issue signals of a form which are a function of the response of said device, a signal generator responsive to signals from said translator, a signal storage means, means to transmit a portion of the generated signal to the storage means, means to establish a predetermined signal in said storage means, and a unitary selection means which is operated independently of said signals from said translator to render said signal establishing means and said signal transmission means effective whereby a predetermined signal is established in said signal storage means and a portion of the generated signal which is correlated to said predetermined signal is transmitted to the storage means.

15. In combination a condition responsive device, a signal translator generating a train of pulses which is a function of the response of said device, a pulse generator connected to said translator and generating a fixed number of pulses for each pulse received from said translator, a plurality of output terminals from said generator each transmitting a fixed number of pulses, a pulse combining matrix, input terminals for said combining matrix connected to corresponding output terminals of said generator, output terminals for said combining matrix passing portions of said fixed number of pulses from said generator as determined by said matrix, a counter, a reset pulse source, a plurality of reset terminals on said counter, each arranged to establish a given count in said counter in response to a pulse imposed thereon, a reset matrix for said counter, an input terminal for said reset matrix connected to said pulse source, a plurality of output terminals for said reset matrix connected to respective reset terminals on said counter, and a selector means for applying the signal from a given output terminal of said combining matrix to said counter input and for applying the signal from a given output terminal of said reset matrix to a given one of said reset terminals.

16. A combination in accordance with claim 15 including a unitary structure physically separable from said generator, counter, and said selector, said structure including said pulse combining matrix, a plurality of pressure type electrical couplings between said generator output terminals and said pulse combining matrix input terminals, and a plurality of pressure type electrical couplings between said pulse combining matrix output terminals and said selector.

17. A combination in accordance with claim 15 including a unitary structure physically separable from said selector, said source and said counter, said structure including said reset matrix, a pressure type electrical coupling between said selector and said reset matrix input terminal and a pressure type electrical coupling between said reset matrix output terminals and said counter reset terminals.

18. In combination a condition responsive device, a signal translator generating a train of pulses which is a function of the response of said device, a pulse generator connected to said translator, a plurality of outputs from said pulse generator each transmitting a given number of pulses from said generator in response to each pulse from said translator, a pulse counter, a plurality of reset terminals for said counter, a reset pulse source, a plurality of selectors, a first terminal of each selector connected to the input of said counter, a second terminal of each selector connectable to said first terminal upon operation of said selector, a third terminal of each selector connected to a reset pulse source, a fourth terminal of each selector connectable to said third terminal upon operation of said selector, and a unitary structure physically separable from the combination and including a reset matrix, a pulse combining matrix, a first plurality of pressure type terminals each engageable with a respective one of said outputs from said pulse generator and connected to the inputs of said pulse combining matrix, a second plurality of pressure type terminals each engageable with a respective second terminal of said selectors and connected to the outputs of said pulse combining matrix, a third plurality of pressure type terminals engageable with respective fourth terminals of said selectors and connected to the inputs of said reset matrix, and a fourth plurality of pressure type terminals engageable with respective reset terminals of said counter and connected to the outputs of said reset matrix.

19. In combination a calculating mechanism, means feeding signals to said calculating mechanism, a plurality of means each individually effective to establish a given constant in said mechanism upon reception of an initial portion of a signal from said feeding means, a plurality of means each individually effective to establish a computing factor to be applied to said signal which is correlated to one of said given constants, and a plurality of manually operable selection means each actuating a constant and a factor establishing means to render effective a given constant and a correlated factor.

20. In combination a pulse counter; a pulse generator; a plurality of circuits, each for transmitting certain of the pulses issued by said pulse generator to said pulse counter; a reset signal generator; a plurality of reset circuits for coupling said reset signal generator to said pulse counter; a selector means for rendering effective upon said counter a given one of said transmitting and a correlated given one of said reset circuits; a unitary structure separable from the combination and including a portion of one of said transmitting circuits and a portion of one of said reset circuits correlated to said one transmitting circuit; and mechanically releasable means for electrically connecting the circuit portions of said structure between said respective signal generators and said counter.

21. In combination a pulse counter; a pulse generator; a plurality of circuits, each for transmitting certain of the pulses issued by said pulse generator to said pulse counter; a reset signal generator; a plurality of reset circuits for coupling said reset signal generator to said pulse counter; a selector means for rendering effective upon said counter a given one of said transmitting and a correlated given one of said reset circuits; a unitary structure separable from the combination including portions of a plurality of said transmitting circuits and portions of a plurality of said reset circuits, certain of said reset circuit portions and certain of said transmitting circuit portions being for correlated circuits; and mechanically releasable means for electrically connecting the circuit portions of said structure between said respective signal generators and said counter.

22. In combination a pulse counter; a pulse generator; a plurality of circuits, each for transmitting certain of the pulses issued by said pulse generator to said pulse counter; a selection means for rendering effective upon said counter a given one of said transmitting circuits; a unitary structure separable from the combination and including portions of each of a plurality of said transmitting circuits; and mechanically releasable means for electrically connecting the circuit portions of said structure between said pulse generator and said counter.

23. In combination a pulse counter; a reset signal generator; a plurality of reset circuits for coupling said reset signal generator to said pulse counter; a selector means for rendering effective upon said counter a given one of said reset circuits; a unitary structure separable from the combination and including portions of each of a plurality of said reset circuits; and mechanically releasable means for electrically connecting the circuit portions of said structure between said reset signal generator and said counter.

24. In combination a pulse counter; a pulse generator; a plurality of circuits, each for transmitting certain of the pulses issued by said pulse generator to said pulse counter; a reset signal generator; a plurality of reset circuits for coupling said reset signal generator to said pulse counter; a selector means for rendering effective upon said counter a given one of said transmitting and a correlated given one of said reset circuits; a plurality of output terminals to which signals are transmitted from said pulse generator and said reset signal generator; a plurality of input terminals from which signals are transmitted to said counter; a unitary structure separable from the combination and including a portion of a transmitting circuit and a reset circuit; and mechanically releasable connections on said structure electrically connected to respective transmitting and resetting circuit portions of said structure for electrically connecting said circuit portions between certain of said output and input terminals.

25. In combination a pulse counter; a pulse generator; a plurality of circuits, each for transmitting certain of the pulses issued by said pulse generator to said pulse counter; a selector means for rendering effective upon said counter a given one of said transmitting circuits; a plurality of output terminals to which signals are transmitted from said pulse generator; a plurality of input terminals from which pulses are transmitted to said counter; a unitary structure separable from the combination and including portions of a plurality of said transmitting circuits; and mechanically releasable connections on said structure electrically connected to respective transmitting circuit portions of said structure for electrically connecting said circuit portions between certain of said output and input terminals.

26. In combination, a pulse counter; a reset signal generator; a plurality of reset circuits for coupling said reset signal generator to said pulse counter; a selector means for rendering effective upon said counter a given one of said reset circuits; an output terminal to which signals are transmitted from said reset signal generator; a unitary structure separable from the combination and including portions of a plurality of said reset circuits; and mechanically releasable connections on said structure electrically connected to respective reset circuit portions of said structure for electrically connecting said circuit portions between said input terminal and certain of said output terminals.

27. In combination a pulse counter; a reset signal generator; a plurality of reset circuits for coupling said reset signal generator to said pulse counter; a selector means for rendering effective upon said counter a given one of said reset circuits; a plurality of output terminals to which signals are transmitted from said reset signal generator; a plurality of input terminals from which signals are transmitted to said counter; a unitary structure separable from the combination and including portions of a plurality of said reset circuits; and mechanically releasable connections on said structure electrically connected to respective reset circuit portions of said structure for electrically connecting said circuit portions between certain of said output and input terminals.

28. In combination, a pulse counter; a pulse generator; a plurality of circuits, each for transmitting certain of the pulses issued by said pulse generator to said pulse counter; a reset signal generator; a plurality of reset circuits coupling said reset signal generator to said pulse counter; a selector means for rendering effective upon said counter a given one of said transmitting and a correlated given one of said reset circuits; a plurality of output terminals to which signals are transmitted from said pulse generator and said reset signal generator; a plurality of input terminals from which signals are transmitted to said counter; a unitary structure separable from the combination and including portions of each of a plurality of transmitting circuits and each of a plurality of reset circuits; and mechanically releasable connections on said structure electrically connected to respective transmitting and reset circuit portions of said structure for electrically connecting said circuit portions between certain of said output and input terminals.

29. In combination a condition responsive mechanism, a calculating mechanism, means repetitively translating a signal from said condition responsive mechanism to a form for utilization by said calculating mechanism, means transmitting the translated form of said signal to said calculating mechanism, means to select and to establish a computing factor and a correlated constant in said calculating mechanism, means to sense the attainment of a given degree of quiescence in said condition responsive mechanism, means to define a complete signal, and means to enable an effective computation by said calculating mechanism upon the definition of a complete signal initiated subsequent to the operation of said selection means and to the sensing of said given degree of quiescence.

30. In combination a condition responsive mechanism, a calculating mechanism, means repetitively translating a signal from said condition responsive mechanism to a form for utilization by said calculating mechanism means transmitting the translated form of said signal to said calculating mechanism, means to sense the attainment of a given degree of quiescence in said condition responsive mechanism, means to define a complete signal, and means to enable an effective computation by said calculating mechanism upon the definition of a complete signal initiated subsequent to the sensing of said given degree of quiescence.

References Cited in the file of this patent

UNITED STATES PATENTS

| | | |
|---|---|---|
| 1,990,304 | Mulford et al. | Feb. 5, 1935 |
| 2,120,373 | Rast | June 14, 1938 |
| 2,176,929 | Smith | Oct. 24, 1939 |
| 2,178,064 | Bryce | Oct. 31, 1939 |
| 2,226,980 | Rast | Dec. 31, 1940 |
| 2,688,878 | Kolisch | Sept. 14, 1954 |
| 2,708,368 | Kolisch | May 17, 1955 |
| 2,717,733 | Luhn et al. | Sept. 13, 1955 |
| 2,727,391 | Kolisch | Dec. 20, 1955 |
| 2,766,936 | Dimmer | Oct. 16, 1956 |
| 2,803,448 | Biebel | Aug. 20, 1957 |

UNITED STATES PATENT OFFICE
CERTIFICATE OF CORRECTION

Patent No. 3,039,686　　　　　　　　　　　　　June 19, 1962

Robert E. Bell et al.

It is hereby certified that error appears in the above numbered patent requiring correction and that the said Letters Patent should read as corrected below.

Column 5, line 9, for "Serial No. 553,437" read -- Serial No. 553,457 --; same line 9, for "Patent No. 2,849,437" read -- Patent No. 2,938,126 --; line 20, for "follownig" read -- following --; column 6, line 54, for "Patent No. 2,893,126" read -- Patent No. 2,938,126 --; line 59, after "Williams" insert -- , Jr. --; column 7, line 71, for "noramally" read -- normally --; column 8, line 8, for "hereby" read -- thereby --; column 10, line 12, for "scane" read -- scan --; line 33, for "in" read -- on --; column 12, line 22, for "seevn" read -- seven --; line 55, for "114" read -- 144 --; line 75, for "for" read -- of --; column 23, line 18, for "geneartor" read -- generator --.

Signed and sealed this 28th day of July 1964.

(SEAL)
Attest:

ESTON G. JOHNSON
Attesting Officer

EDWARD J. BRENNER
Commissioner of Patents